US012380325B2

United States Patent
Oh et al.

(10) Patent No.: US 12,380,325 B2
(45) Date of Patent: Aug. 5, 2025

(54) NEURAL PROCESSING DEVICE AND METHOD FOR SYNCHRONIZATION THEREOF

(71) Applicant: Rebellions Inc., Seongnam-si (KR)

(72) Inventors: Jinwook Oh, Seongnam-si (KR);
Jinseok Kim, Seongnam-si (KR);
Kyeongryeol Bong, Seongnam-si (KR);
Wongyu Shin, Seongnam-si (KR);
Chang-Hyo Yu, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 0 days.

(21) Appl. No.: 18/298,935

(22) Filed: Apr. 11, 2023

(65) Prior Publication Data

US 2023/0244920 A1 Aug. 3, 2023

Related U.S. Application Data

(63) Continuation of application No. 17/661,414, filed on Apr. 29, 2022, now Pat. No. 11,657,261.

(30) Foreign Application Priority Data

Dec. 30, 2021 (KR) .................. 10-2021-0192179

(51) Int. Cl.
*G06N 3/063* (2023.01)
*G06F 5/06* (2006.01)
(Continued)

(52) U.S. Cl.
CPC ............. *G06N 3/063* (2013.01); *G06F 5/065* (2013.01); *G06F 9/3877* (2013.01); *G06F 9/52* (2013.01)

(58) Field of Classification Search
CPC .............................. G06N 3/063; G06F 9/3877
See application file for complete search history.

(56) References Cited

U.S. PATENT DOCUMENTS

| | | |
|---|---|---|
| 2005/0050374 A1 | 3/2005 | Nakamura et al. |
| 2006/0212868 A1 | 9/2006 | Takayama et al. |
| (Continued) | | |

FOREIGN PATENT DOCUMENTS

KR     10-2258566 B1    6/2021

OTHER PUBLICATIONS

Office Action for KR 10-2021-0192179 by Korean Intellectual Property Office dated Mar. 19, 2024.
(Continued)

*Primary Examiner* — Michael J Metzger
(74) *Attorney, Agent, or Firm* — BROADVIEW IP LAW, PC

(57) ABSTRACT

A neural processing device is provided. The neural processing device comprises a plurality of neural processors, a shared memory shared by the plurality of neural processors, a plurality of semaphore memories, and global interconnection. The plurality of neural processors generates a plurality of L3 sync targets, respectively. Each semaphore memory is associated with a respective one of the plurality of neural processors, and the plurality of semaphore memories receive and store the plurality of L3 sync targets, respectively. Synchronization of the plurality of neural processors is performed according to the plurality of L3 sync targets. The global interconnection connects the plurality of neural processors with the shared memory, and comprises an L3 sync channel through which an L3 synchronization signal corresponding to at least one L3 sync target is transmitted.

19 Claims, 30 Drawing Sheets

(51) Int. Cl.
    *G06F 9/38*          (2018.01)
    *G06F 9/52*          (2006.01)

(56) References Cited

U.S. PATENT DOCUMENTS

| | | | |
|---|---|---|---|
| 2014/0053009 A1* | 2/2014 | Semin | G06F 1/329 |
| | | | 713/322 |
| 2016/0041838 A1 | 2/2016 | Nicholas et al. | |
| 2017/0024321 A1* | 1/2017 | Kanehagi | G06F 12/084 |
| 2020/0073830 A1 | 3/2020 | Verrilli et al. | |
| 2020/0106717 A1* | 4/2020 | Hollis | H04L 49/201 |
| 2021/0286755 A1 | 9/2021 | Vorbach | |
| 2021/0343352 A1* | 11/2021 | Cho | G11C 16/26 |

OTHER PUBLICATIONS

Extended European Search Report for EP 22213853.9 by European Patent Office dated May 25, 2023.
Office Action for EP 22213853.9 by European Patent Office dated May 14, 2025.
Bilir, E. Ender et al., "Multicast Snooping: A New Coherence Method Using a Multicast Address Network," Proceedings of the 26th International Symposium on Computer Architecture (Cat. No.99CB36367). May 1999. doi: 10.1109/ISCA.1999.765959.

\* cited by examiner

NEURAL PROCESSING DEVICE AND METHOD FOR SYNCHRONIZATION THEREOF

CROSS-REFERENCE TO RELATED APPLICATION

This application is a continuation of U.S. patent application Ser. No. 17/661,414 filed on Apr. 29, 2022, which claims priority under 35 U.S.C § 119 to Korean Patent Application No. 10-2021-0192179 filed in the Korean Intellectual Property Office on Dec. 30, 2021, which is hereby incorporated by references in its entirety.

TECHNICAL FIELD

The disclosure relates to a neural processing device and a synchronization method thereof, and more particularly to, for example, but not limited to a neural processing device in which each processor performs synchronization instead of a central control processor, and a synchronization method thereof.

BACKGROUND

For the last few years, artificial intelligence technology has been the core technology of the Fourth Industrial Revolution and the subject of discussion as the most promising technology worldwide. The biggest problem with such artificial intelligence technology is computing performance. For artificial intelligence technology which realizes human learning ability, reasoning ability, perceptual ability, natural language implementation ability, etc., it is of utmost important to process a large amount of data quickly.

The central processing unit (CPU) or graphics processing unit (GPU) of off-the-shelf computers was used for deep-learning training and inference in early artificial intelligence, but had limitations on the tasks of deep-learning training and inference with high workloads, and thus, neural processing units (NPUs) that are structurally specialized for deep learning tasks have received a lot of attention.

Since such a neural processing unit includes a large number of processing units and cores inside thereof, the synchronization of these modules is required to be clearly processed according to the dependency of a task. In conventional processing units, a control processor or centralized controller centrally controlled these synchronization signals and managed operations in order.

However, such a method can result in a lot of latency in synchronization processing and increased overhead of the control processor as more and more processing units and cores are included in the neural processing unit.

The description set forth in the background section should not be assumed to be prior art merely because it is set forth in the background section. The background section may describe aspects or embodiments of the present disclosure.

SUMMARY

Aspects of the present disclosure provide a neural processing device capable of fast and efficient synchronization processing.

Aspects of the present disclosure provide a method for synchronizing a neural processing device capable of fast and efficient synchronization processing.

According to some aspects of the present disclosure, a neural processing device comprises: a plurality of neural processors configured to generate a plurality of L3 sync targets, respectively, a shared memory shared by the plurality of neural processors, a plurality of semaphore memories, each associated with a respective one of the plurality of neural processors, the plurality of semaphore memories configured to receive and store the plurality of L3 sync targets, respectively, wherein synchronization of the plurality of neural processors is performed according to the plurality of L3 sync targets, and a global interconnection configured to connect the plurality of neural processors with the shared memory, and comprising an L3 sync channel through which an L3 synchronization signal corresponding to at least one L3 sync target is transmitted.

According to some aspects, the global interconnection further comprises: a data channel configured to transmit data between the shared memory and the plurality of neural processors, and a control channel configured to transmit a control signal to the plurality of neural processors.

According to some aspects, at least one semaphore memory comprises a plurality of fields, each associated with a respective one of the plurality of neural processors.

According to some aspects, the neural processing device further comprises a plurality of FIFO buffers, each associated with a respective one of the plurality of fields, the plurality of FIFO buffers associated with one of the plurality of neural processors, and each FIFO buffer configured to transfer values of an associated field sequentially to an associated neural processor.

According to some aspects, at least one L3 sync target comprises a plurality of sync target fields, each associated with a respective one of the plurality of neural processors, and each of the plurality of sync target fields indicates whether an associated neural processor receives the synchronization signal.

According to some aspects, the plurality of sync target fields are arranged in the order of virtual IDs of the plurality of neural processors.

According to some aspects, at least one neural processor identifies a physical ID of a neural processor that receives the synchronization signal, by using an L3 sync target associated with the at least one neural processors and a VPID table, and the VPID table comprises information for converting the virtual ID and the physical ID.

According to some aspects, the L3 sync target is included in an instruction set architecture (ISA).

According to some aspects, at least one neural processor comprises: a plurality of neural cores, and a local interconnection configured to transmit data between the plurality of neural cores.

According to some aspects, the at least one neural processor further comprises: an L2 sync path along which an L2 synchronization signal for performing synchronization between the plurality of neural cores is transmitted.

According to some aspects, the at least one neural core comprises: a processing unit configured to receive an input activation and a weight, perform deep learning calculations, and output an output activation, and a local memory configured to temporarily store the input activation, the weight, and the output activation.

According to some aspects of the present disclosure, a neural processing device comprises: at least one neural processor, a shared memory, and a global interconnection configured to connect the at least one neural processor and the shared memory, and used for L3 synchronization of the neural processor, wherein the neural processor comprises: a plurality of neural cores, a local interconnection configured to connect the plurality of neural cores, and an L2 sync path used for L2 synchronization of the plurality of neural cores, and wherein each of the plurality of neural cores comprises: a processing unit configured to perform calculation tasks, a local memory configured to temporarily store data, and an L1 sync path used for L1 synchronization of the local memory and the processing unit.

According to some aspects, the at least one neural processor includes a plurality of neural processors, and the global interconnection comprises: a data channel configured to transmit data between the at least one neural processor and the shared memory, a control channel configured to transmit a control signal between the plurality of neural processors, and a sync channel used for the L3 synchronization.

According to some aspects, at least one neural processor further comprises: a local interconnection configured to transmit data between the plurality of neural cores.

According to some aspects, at least one neural core further comprises a data path used for exchanging data between the local memory and the processing unit.

According to some aspects, the at least one neural processor comprises a plurality of neural processors, and the neural processing device further comprising: a plurality of semaphore memories, each associated with a respective one of the plurality of neural processors, and configured to receive and store an L3 synchronization signal, wherein synchronization of the plurality of neural processors is performed according to values of the plurality of semaphore memories.

According to some aspects, at least one semaphore memory comprises a plurality of fields, each associated with a respective one of the plurality of neural processors, and the neural processing device further comprising: a plurality of FIFO buffers, each associated with a respective one of the plurality of fields, the plurality of FIFO buffers associated with one of the plurality of neural processors, and each FIFO buffer configured to transfer values of an associated field sequentially to an associated neural processor.

According to some aspects, at least one neural processor transmits an instruction set architecture, and the instruction set architecture comprises an operation code, an L3 sync target for the L3 synchronization, an L2 sync target for the L2 synchronization, and an L1 sync target for the L1 synchronization.

According to some aspects of the present disclosure, a method for synchronizing a neural processing device including first and second neural processors, the method comprises: generating, by the first neural processor, an L3 sync target for L3 synchronization, wherein fields of the L3 sync target are associated with virtual IDs of the first and second neural processors, identifying a physical ID of the second neural processor by using the L3 sync target and a VPID table, wherein the VPID table includes relationship between the virtual ID and the physical ID of the second neural processor, storing a synchronization signal corresponding to the L3 sync target in a semaphore memory of the second neural processor, via an L3 sync channel of a global interconnection, and performing, by the second neural processor, L3 synchronization according to a value of the semaphore memory.

According to some aspects, the fields of the semaphore memory comprises first and second fields respectively associated with the first and second neural processors, and the first and second fields are arranged in the order of the virtual IDs of the first and second neural processors.

According to some aspects, the performing L3 synchronization comprises: providing a value of the first field to the second neural processor based on FIFO, and providing a value of the second field to the second neural processor based on FIFO.

According to some aspects, the virtual IDs comprise first and second virtual IDs respectively associated with the first and second neural processors.

According to some aspects, the first neural processor comprises: first and second neural cores, a local interconnection configured to transmit data between the first and second neural cores, and an L2 sync path configured to transmit a synchronization signal corresponding to an L2 sync target between the first and second neural cores.

According to some aspects, the first neural core comprises: a first processing unit configured to receive a first input activation and a first weight, perform deep learning calculations, and output a first output activation, a first local memory configured to temporarily store the first input activation, the first weight, and the first output activation, and a first L1 sync path configured to transmit a synchronization signal corresponding to an L1 sync target between the first local memory and the first processing unit, and the second neural core comprises: a second processing unit configured to receive a second input activation and a second weight, perform deep learning calculations, and output a second output activation, a second local memory configured to temporarily store the second input activation, the second weight, and the second output activation, and a second L1 sync path configured to transmit the synchronization signal corresponding to the L1 sync target between the second local memory and the second processing unit.

According to some aspects, the method further comprises: storing data in the first local memory, transmitting a synchronization signal according to the L1 sync target via the first L1 sync path, inside the first neural core, transmitting, by the first neural core, a synchronization signal corresponding to the L2 sync target to the second neural core via the second L2 sync path, and receiving, by the second neural core, data via the local interconnection.

According to some aspects of the present disclosure, a method for synchronizing a neural processing device, wherein the neural processing device comprises first and second neural cores, a local interconnection configured to connect the first and second neural cores, and an L2 sync path used for L2 synchronization of the first and second neural cores, wherein the first neural core comprises a first processing unit configured to perform calculation tasks, a first local memory configured to temporarily store data inputted to and outputted from the first processing unit, and a first L1 sync path used for L1 synchronization of the first local memory and the first processing unit, and wherein the second neural core comprises a second processing unit configured to perform calculation tasks, a second local memory configured to temporarily store data inputted to and outputted from the second processing unit, and a second L1 sync path used for L1 synchronization of the second local memory and the second processing unit, the method further comprising: storing data in the first local memory, transmitting a synchronization signal corresponding to an L1 sync target via the first L1 sync path, inside the first neural core, transmitting, by the first neural core, a synchronization signal corresponding to an L2 sync target to the second neural core via the second L2 sync path, and receiving, by the second neural core, data via the local interconnection.

According to some aspects, the first neural core further comprises a first load/store unit (LSU) configured to move data between the first local memory and the local interconnection, the first LSU comprises a first local memory store unit configured to perform storage of the first local memory, and a first neural core store unit configured to perform storage from the first neural core to the outside, and the transmitting a synchronization signal corresponding to the L1 sync target via the first L1 sync path, inside the first neural core, comprises: transmitting, by the first local memory store unit, a synchronization signal corresponding to the L1 sync target to the first neural core store unit.

According to some aspects, the second neural core further comprises a second LSU configured to move data between the local memory and the second local interconnection, the second LSU comprises a second neural core load unit configured to perform loading externally in the second neural core, and the transmitting a synchronization signal corresponding to the L2 sync target comprises: transmitting, by the first neural core store unit, the synchronization signal corresponding to the L2 sync target to the second neural core load unit.

According to some aspects, the neural processing device comprises a first neural processor comprising the first and second neural cores, the local interconnection, and the L2 sync path, a second neural processor that is different from the first neural processor, a global interconnection configured to transmit data between the first and second neural processors, and first and second semaphore memories corresponding to the first and second neural processors, respectively, and the global interconnection comprises a data channel, a control channel, and an L3 sync channel through which data, a control signal, and a synchronization signal corresponding to an L3 sync target are, respectively, transmitted between the first and second neural processors, the method comprising: generating, by the first neural processor, the L3 sync target, storing the synchronization signal corresponding to the L3 sync target in a semaphore memory, and performing, by the second neural processor, synchronization via a value of the second semaphore memory.

Aspects of the present disclosure are not limited to those mentioned above, and other objects and advantages of the present disclosure that have not been mentioned can be understood by the following description, and will be more clearly understood by embodiments of the present disclosure. In addition, it will be readily understood that the objects and advantages of the present disclosure can be realized by the means and combinations thereof set forth in the claims.

The neural processing device and the synchronization method thereof of the present disclosure can minimize the latency resulting from the synchronization request transferred to the control processor since the respective processors, cores, and memory elements instead of a centralized control processor transfer synchronization requests to one another and perform synchronization.

Further, it is not necessary to perform the scheduling task that has been performed by the control processor anymore, and thus the scheduling overhead of the neural processing device can be greatly reduced.

In addition to the foregoing, the specific effects of the present disclosure will be described together while elucidating the specific details for carrying out the embodiments below.

DETAILED DESCRIPTION OF THE PREFERRED EMBODIMENTS

Figure 1:
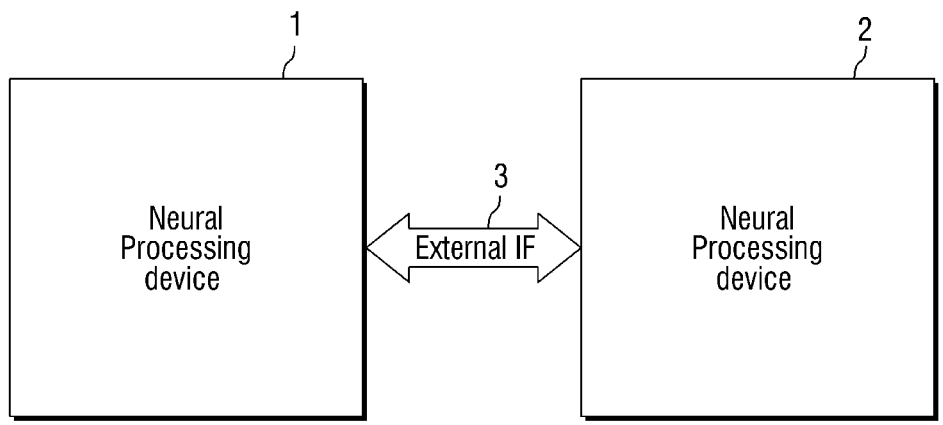
FIG. 1 is a block diagram for illustrating a neural processing system in accordance with some embodiments.

The terms or words used in the present disclosure and the claims should not be construed as limited to their ordinary or lexical meanings. They should be construed as the meaning and concept in line with the technical idea of the present disclosure based on the principle that the inventor can define the concept of terms or words in order to describe his/her own embodiments in the best possible way. Further, since the embodiment described herein and the configurations illustrated in the drawings are merely one embodiment in which the present disclosure is realized and do not represent all the technical ideas of the present disclosure, it should be understood that there may be various equivalents, variations, and applicable examples that can replace them at the time of filing this application.

Although terms such as first, second, A, B, etc. used in the present description and the claims may be used to describe various components, the components should not be limited by these terms. These terms are used only for the purpose of distinguishing one component from another. For example, a first component may be referred to as a second component, and similarly, a second component may be referred to as a first component, without departing from the scope of the present disclosure. The term 'and/or' includes a combination of a plurality of related listed items or any item of the plurality of related listed items.

The terms used in the present description and the claims are merely used to describe particular embodiments and are not intended to limit the present disclosure. Singular expressions include plural expressions unless the context explicitly indicates otherwise. In the present application, terms such as "comprise," "have," "include", "contain," etc. should be understood as not precluding the possibility of existence or addition of features, numbers, steps, operations, components, parts, or combinations thereof described herein.

Unless otherwise defined, all terms used herein, including technical or scientific terms, have the same meaning as commonly understood by those of ordinary skill in the art to which the present disclosure pertains.

Terms such as those defined in commonly used dictionaries should be construed as having a meaning consistent with the meaning in the context of the relevant art, and are not to be construed in an ideal or excessively formal sense unless explicitly defined in the present disclosure.

In addition, each configuration, procedure, process, method, or the like included in each embodiment of the present disclosure may be shared to the extent that they are not technically contradictory to each other.

In the following, a neural processing device in accordance with some embodiments will be described with reference to FIGS. 1 to 26.

FIG. 1 is a block diagram for illustrating a neural processing system in accordance with some embodiments.

Referring to FIG. 1, a neural processing system NPS in accordance with some embodiments may include a first neural processing device 1, a second neural processing device 2, and an external interface 3.

The first neural processing device 1 may be a device that performs calculations using an artificial neural network. The first neural processing device 1 may be, for example, a device specialized in performing the task of deep learning calculations. However, the present embodiment is not limited thereto.

The second neural processing device 2 may be a device having the same or similar configuration as the first neural processing device 1. The first neural processing device 1 and the second neural processing device 2 may be connected to each other via the external interface 3 and share data and control signals.

Although FIG. 1 shows two neural processing devices, the neural processing system NPS in accordance with some embodiments is not limited thereto. That is, in a neural processing system NPS in accordance with some embodiments, three or more neural processing devices may be connected to each other via the external interface 3. Also, conversely, a neural processing system NPS in accordance with some embodiments may include only one neural processing device.

Figure 2:
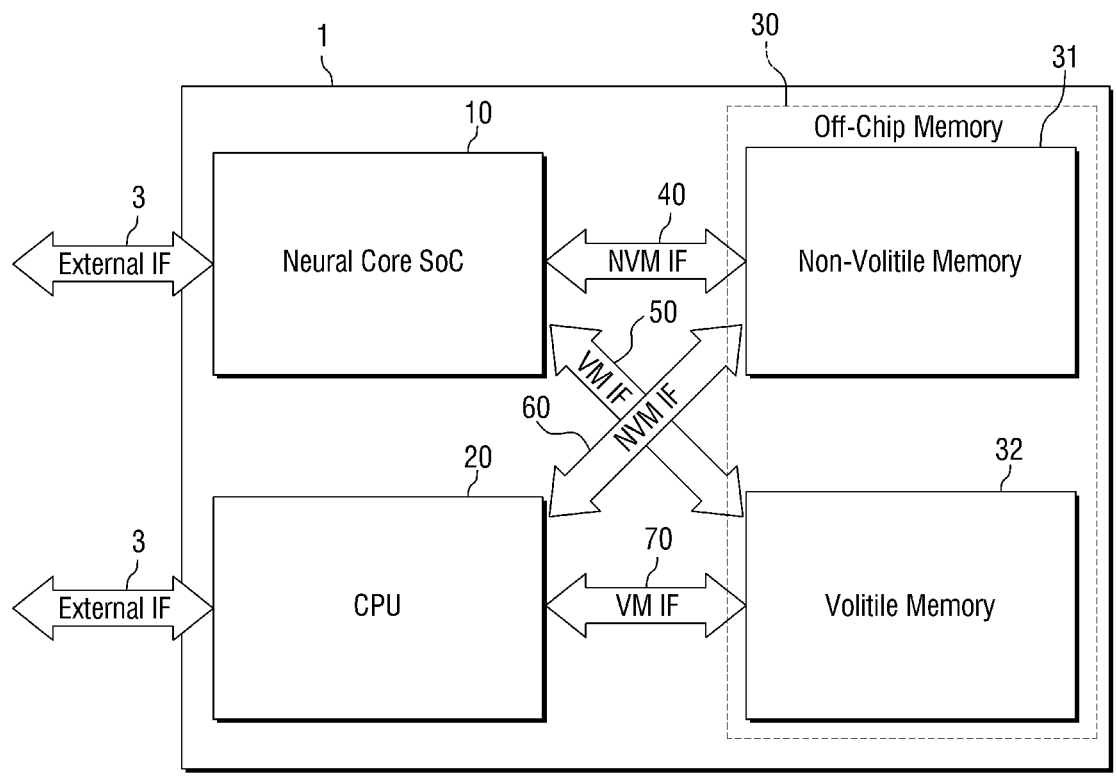
FIG. 2 is a block diagram for illustrating the neural processing device of FIG. 1.

FIG. 2 is a block diagram for illustrating the neural processing device of FIG. 1.

Referring to FIG. 2, the first neural processing device 1 may include a neural core SoC 10, a CPU 20, an off-chip memory 30, a first non-volatile memory interface 40, a first volatile memory interface 50, a second non-volatile memory interface 60, and a second volatile memory interface 70. The off-chip memory 30 may include a non-volatile memory 31 and a volatile memory 32.

The neural core SoC 10 may be a system on a chip device. The neural core SoC 10 is an artificial intelligence calculation device and may be an accelerator. The neural core SoC 10 may be, for example, any one of a graphics processing unit (GPU), a field-programmable gate array (FPGA), and an application-specific integrated circuit (ASIC). However, the present embodiment is not limited thereto.

The neural core SoC 10 may exchange data with other external calculation devices via the external interface 3. Further, the neural core SoC 10 may be connected to the non-volatile memory 31 and the volatile memory 32 via the first non-volatile memory interface 40 and the first volatile memory interface 50, respectively.

The CPU 20 may be a control device that controls the system of the first neural processing device 1 and executes program calculations. The CPU 20 is a general-purpose calculation device and may have low efficiency in performing simple parallel calculations that are used a lot in deep learning. Accordingly, there can be high efficiency by performing calculations in deep learning inference and training tasks by the neural core SoC 10.

The CPU 20 may exchange data with other external calculation devices via the external interface 3. In addition, the CPU 20 may be connected to the non-volatile memory 31 and the volatile memory 32 via the second non-volatile memory interface 60 and the second volatile memory interface 70, respectively.

The off-chip memory 30 may be a memory disposed outside the chip of the neural core SoC 10.

The non-volatile memory 31 may be a memory that continuously retains stored information even if electric power is not supplied. The non-volatile memory 31 may include, for example, at least one of Read-Only Memory (ROM), Programmable Read-Only Memory (PROM), Erasable Alterable ROM (EAROM), Erasable Programmable Read-Only Memory (EPROM), Electrically Erasable Programmable Read-Only Memory (EEPROM) (e.g., NAND Flash memory, NOR Flash memory), Ultra-Violet Erasable Programmable Read-Only Memory (UVEPROM), Ferroelectric Random-Access Memory (FeRAM), Magnetoresistive Random-Access Memory (MRAM), Phase-change Random-Access Memory (PRAM), silicon—oxide—nitride—oxide—silicon (SONOS), Resistive Random-Access Memory (RRAM), Nanotube Random-Access Memory (NRAM), magnetic computer storage devices (e.g., hard disks, diskette drives, magnetic tapes), optical disc drives, and 3D XPoint memory. However, the present embodiment is not limited thereto.

The volatile memory 32 may be a memory that continuously requires electric power to retain stored information, unlike the non-volatile memory 31. The volatile memory 32 may include, for example, at least one of Dynamic Random-Access Memory (DRAM), Static Random-Access Memory (SRAM), Synchronous Dynamic Random-Access Memory (SDRAM), and Double Data Rate SDRAM (DDR SDRAM). However, the present embodiment is not limited thereto.

Each of the first non-volatile memory interface 40 and the second non-volatile memory interface 60 may include, for example, at least one of Parallel Advanced Technology Attachment (PATA), Small Computer System Interface (SCSI), Serial Attached SCSI (SAS), Serial Advanced Technology Attachment (SATA), and PCI Express (PCIe). However, the present embodiment is not limited thereto.

Each of the first volatile memory interface 50 and the second volatile memory interface 70 may be, for example, at least one of SDR (Single Data Rate), DDR (Double Data Rate), QDR (Quad Data Rate), and XDR (eXtreme Data Rate, Octal Data Rate). However, the present embodiment is not limited thereto.

Figure 3:
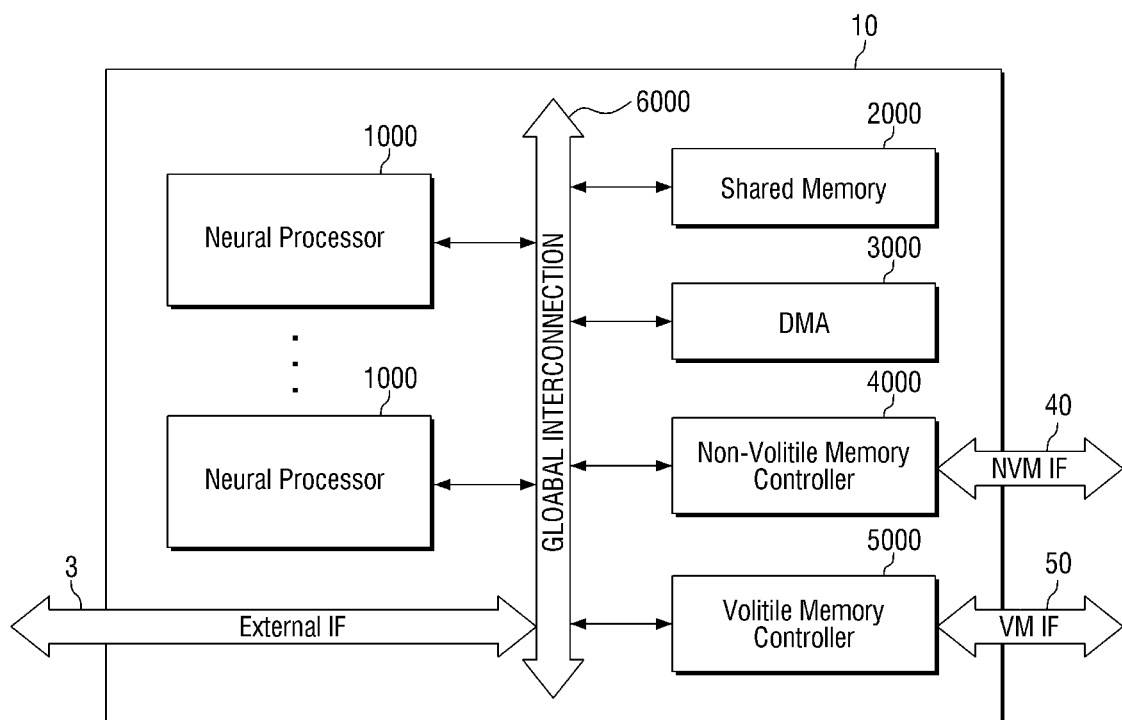
FIG. 3 is a block diagram for illustrating the neural core SoC of FIG. 2.

FIG. 3 is a block diagram for illustrating the neural core SoC of FIG. 2.

Referring to FIGS. 2 and 3, the neural core SoC 10 may include at least one neural processor 1000, a shared memory 2000, direct memory access (DMA) 3000, a non-volatile memory controller 4000, a volatile memory controller 5000, and a global interconnection 6000.

The neural processor 1000 may be a calculation device that directly performs calculation tasks. If there exist neural processors 1000 in plurality, calculation tasks may be assigned to respective neural processors 1000. The respective neural processors 1000 may be connected to each other via the global interconnection 6000.

The shared memory 2000 may be a memory shared by multiple neural processors 1000. The shared memory 2000 may store data of each neural processor 1000. In addition, the shared memory 2000 may receive data from the off-chip memory 30, store them temporarily, and transfer them to each neural processor 1000. On the contrary, the shared memory 2000 may also receive data from the neural processor 1000, store them temporarily, and transfer them to the off-chip memory 30 of FIG. 2.

The shared memory 2000 may need a relatively high-speed memory. Accordingly, the shared memory 2000 may include, for example, an SRAM. However, the present embodiment is not limited thereto. That is, the shared memory 2000 may include a DRAM as well.

The shared memory 2000 may be a memory corresponding to the SoC level, i.e., level 3 (L3). Accordingly, the shared memory 2000 may also be defined as an L3 shared memory.

The DMA 3000 may directly control the movement of data without the need for the neural processor 1000 to control the input/output of data. Accordingly, the DMA 3000 may control the data movement between memories, thereby minimizing the number of interrupts of the neural processor 1000.

The DMA 3000 may control the data movement between the shared memory 2000 and the off-chip memory 30. Via the authority of the DMA 3000, the non-volatile memory controller 4000 and the volatile memory controller 5000 may perform the movement of data.

The non-volatile memory controller 4000 may control the task of reading from or writing onto the non-volatile memory 31. The non-volatile memory controller 4000 may control the non-volatile memory 31 via the first non-volatile memory interface 40.

The volatile memory controller 5000 may control the task of reading from or writing onto the volatile memory 32. Further, the volatile memory controller 5000 may perform a refresh task of the volatile memory 32. The volatile memory controller 5000 may control the non-volatile memory 31 via the first volatile memory interface 50.

The global interconnection 6000 may connect the at least one neural processor 1000, the shared memory 2000, the DMA 3000, the non-volatile memory controller 4000, and the volatile memory controller 5000 to one another. In addition, the external interface 3 may also be connected to the global interconnection 6000. The global interconnection 6000 may be a path through which data travels between the at least one neural processor 1000, the shared memory 2000, the DMA 3000, the non-volatile memory controller 4000, the volatile memory controller 5000, and the external interface 3.

The global interconnection 6000 may transmit not only data but also control signals and may transmit a signal for synchronization. That is, in the neural processing device in accordance with some embodiments, each neural processor 1000 may directly transmit and receive a synchronization signal, instead of a separate control processor managing the synchronization signal. Accordingly, it is possible to preclude the latency of the synchronization signal generated by the control processor.

In other words, if there exist neural processors 1000 in plurality, there may be dependencies of individual tasks in which the task of one neural processor 1000 needs to be finished before the next neural processor 1000 can start a new task. The end and start of these individual tasks can be checked via a synchronization signal, and in conventional techniques, a control processor performed the reception of such a synchronization signal and an instruction to start a new task.

However, as the number of neural processors 1000 increases and task dependencies are designed more complicatedly, the number of requests and instructions for this synchronization task has increased exponentially. Therefore, the latency resulting from each request and instruction can greatly reduce the efficiency of tasks.

Accordingly, in the neural processing device in accordance with some embodiments, each neural processor 1000, instead of the control processor, may directly transmit a synchronization signal to another neural processor 1000 according to the dependency of a task. In this case, several neural processors 1000 can perform the synchronization tasks in parallel as compared with the method managed by the control processor, thereby minimizing the latency due to synchronization.

In addition, the control processor needs to perform the task scheduling of the neural processors 1000 according to a task dependency, and the overhead of such scheduling may also increase significantly as the number of neural processors 1000 increases. Accordingly, in the neural processing device in accordance with some embodiments, the scheduling task is also performed by the individual neural processors 1000, and thus, the performance of the device can be improved without even a scheduling burden resulting therefrom.

Figure 4:
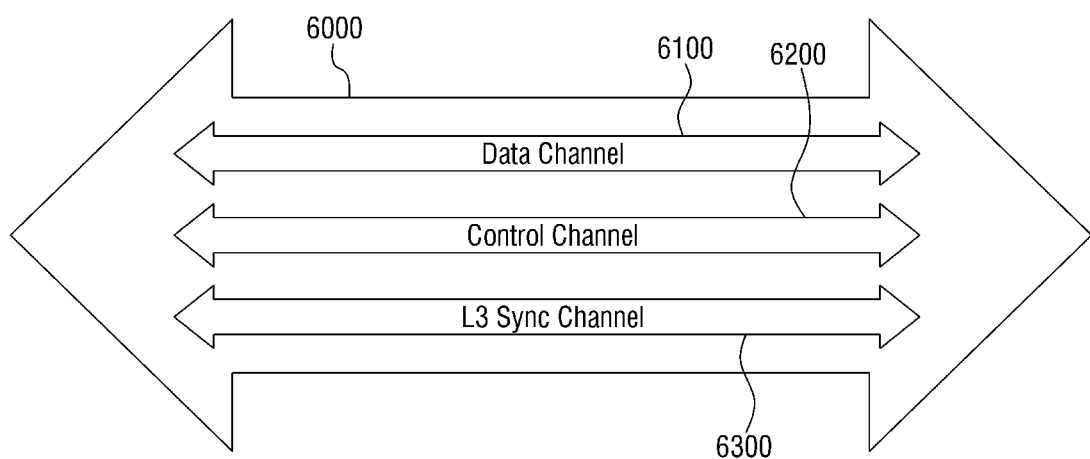
FIG. 4 is a structural diagram for illustrating the global interconnection of FIG. 3.

FIG. 4 is a structural diagram for illustrating the global interconnection of FIG. 3.

Referring to FIG. 4, the global interconnection 6000 may include a data channel 6100, a control channel 6200, and an L3 sync channel 6300.

The data channel 6100 may be a dedicated channel for transmitting data. Through the data channel 6100, the at least one neural processor 1000, the shared memory 2000, the DMA 3000, the non-volatile memory controller 4000, the volatile memory controller 5000, and the external interface 3 may exchange data with one another.

The control channel 6200 may be a dedicated channel for transmitting control signals. Through the control channel 6200, the at least one neural processor 1000, the shared memory 2000, the DMA 3000, the non-volatile memory controller 4000, the volatile memory controller 5000, and the external interface 3 may exchange control signals with one another.

The L3 sync channel 6300 may be a dedicated channel for transmitting synchronization signals. Through the L3 sync channel 6300, the at least one neural processor 1000, the shared memory 2000, the DMA 3000, the non-volatile memory controller 4000, the volatile memory controller 5000, and the external interface 3 may exchange synchronization signals with one another.

The L3 sync channel 6300 may be set as a dedicated channel inside the global interconnection 6000, and thus, may not overlap with other channels and transmit synchronization signals quickly. Accordingly, the neural processing device in accordance with some embodiments does not require new wiring work and may smoothly perform the synchronization task by using the global interconnection 6000.

Figure 5:
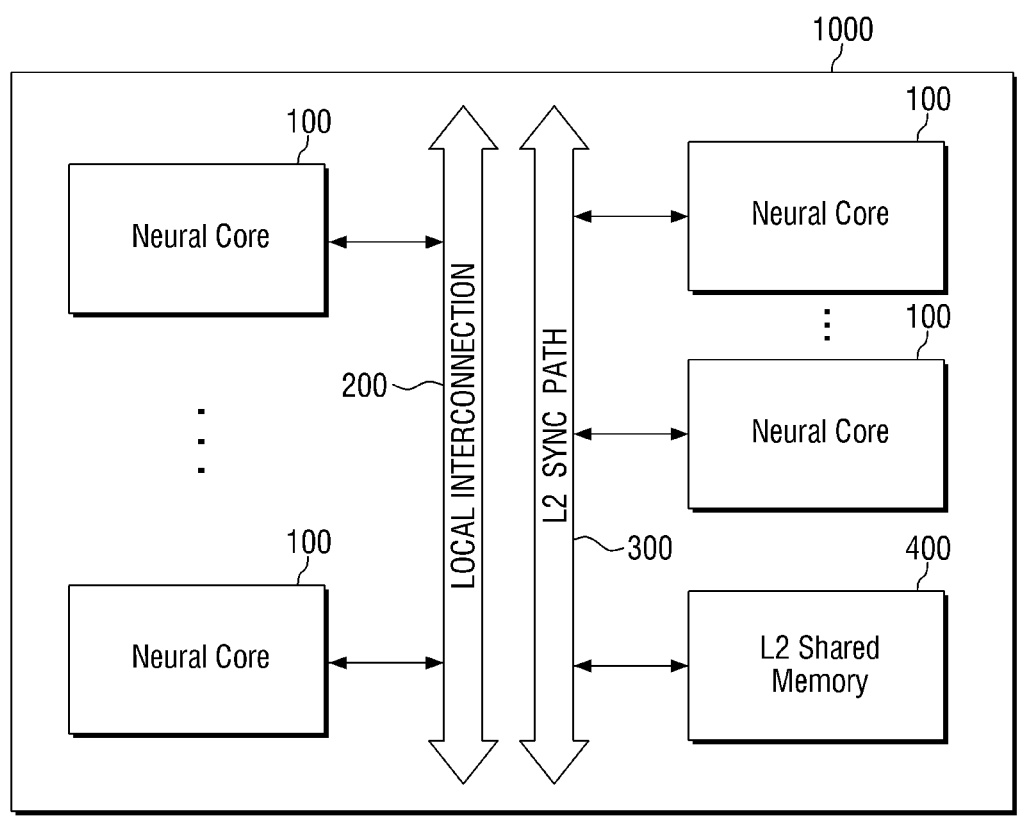
FIG. 5 is a block diagram for illustrating the neural processor of FIG. 3.

FIG. 5 is a block diagram for illustrating the neural processor of FIG. 3.

Referring to FIGS. 3 to 5, the neural processor 1000 may include at least one neural core 100, an L2 shared memory 400, a local interconnection 200, and an L2 sync path 300.

The at least one neural core 100 may share and perform the tasks of the neural processor 1000. The number of neural cores 100 may be, for example, eight. However, the present embodiment is not limited thereto. FIGS. 4 and 5 illustrate that a plurality of neural cores are included in the neural processor 1000, but the present embodiment is not limited thereto. That is, the neural processor 1000 may be configured with only one neural core.

The L2 shared memory 400 may be a memory shared by the neural cores 100 in the neural processor 1000. The L2 shared memory 400 may store data of each neural core 100. In addition, the L2 shared memory 400 may receive data from the shared memory 2000 of FIG. 3, store them temporarily, and transfer them to each neural core 100. On the contrary, the L2 shared memory 400 may also receive data from the neural core 100, store them temporarily, and transfer them to the shared memory 2000 of FIG. 3.

The L2 shared memory 400 may be a memory corresponding to the neural processor level, i.e., level 2 (L2). The L3 shared memory, i.e., the shared memory 2000 may be shared by the neural processors 1000, and the L2 shared memory 400 may be shared by the neural cores 100.

The local interconnection 200 may connect the at least one neural core 100 and the L2 shared memory 400 to each other. The local interconnection 200 may be a path through which data travels between the at least one neural core 100 and the L2 shared memory 400. The local interconnection 200 may be connected and transmit data to the global interconnection 6000 of FIG. 3.

The L2 sync path 300 may connect the at least one neural core 100 and the L2 shared memory 400 to each other. The L2 sync path 300 may be a path through which synchronization signals of the at least one neural core 100 and the L2 shared memory 400 travel.

The L2 sync path 300 may be formed physically separately from the local interconnection 200. In the case of the local interconnection 200, sufficient channels may not be formed therein, unlike the global interconnection 6000. In such a case, the L2 sync path 300 may be formed separately so that the synchronization signal can be transmitted quickly and without any delay. The L2 sync path 300 may be used for synchronization performed at a level one step lower than that of the L3 sync channel 6300 of the global interconnection 6000.

Figure 6:
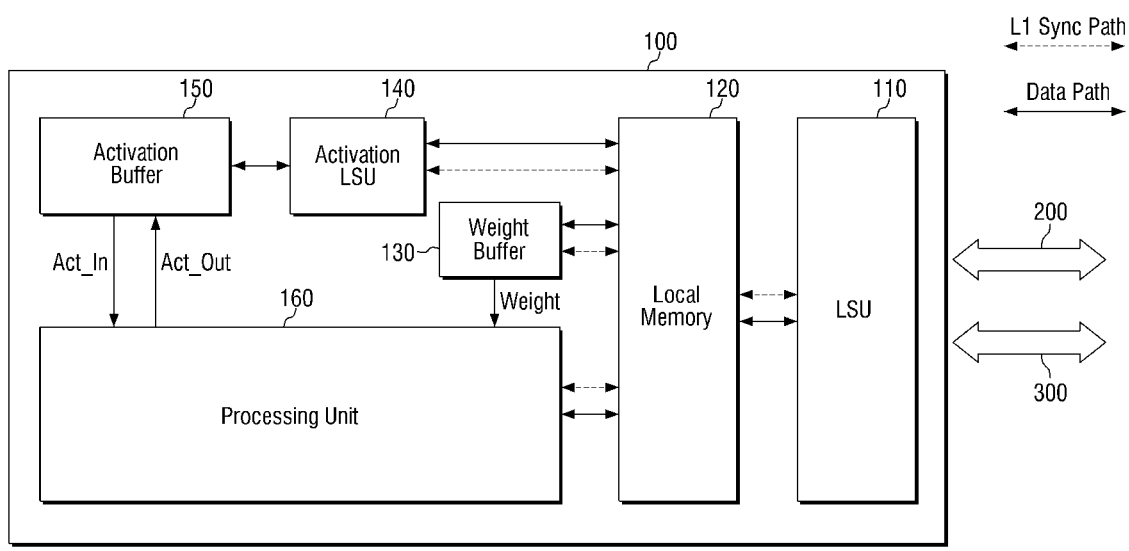
FIG. 6 is a block diagram for illustrating the neural core of FIG. 5.

FIG. 6 is a block diagram for illustrating the neural core of FIG. 5.

Referring to FIG. 6, each of the at least one neural core 100 may include a load/store unit (LSU) 110, a local memory 120, a weight buffer 130, an activation LSU 140, an activation buffer 150, and a processing unit 160.

The LSU 110 may receive at least one of data, a control signal, and a synchronization signal from the outside via the local interconnection 200 and the L2 sync path 300. The LSU 110 may transmit at least one of the data, the control signal, and the synchronization signal received to the local memory 120. Similarly, the LSU 110 may transfer at least one of the data, the control signal, and the synchronization signal to the outside via the local interconnection 200 and the L2 sync path 300. Hereinafter, the LSU 110 will be described in more detail with reference to FIG. 7.

Figure 7:
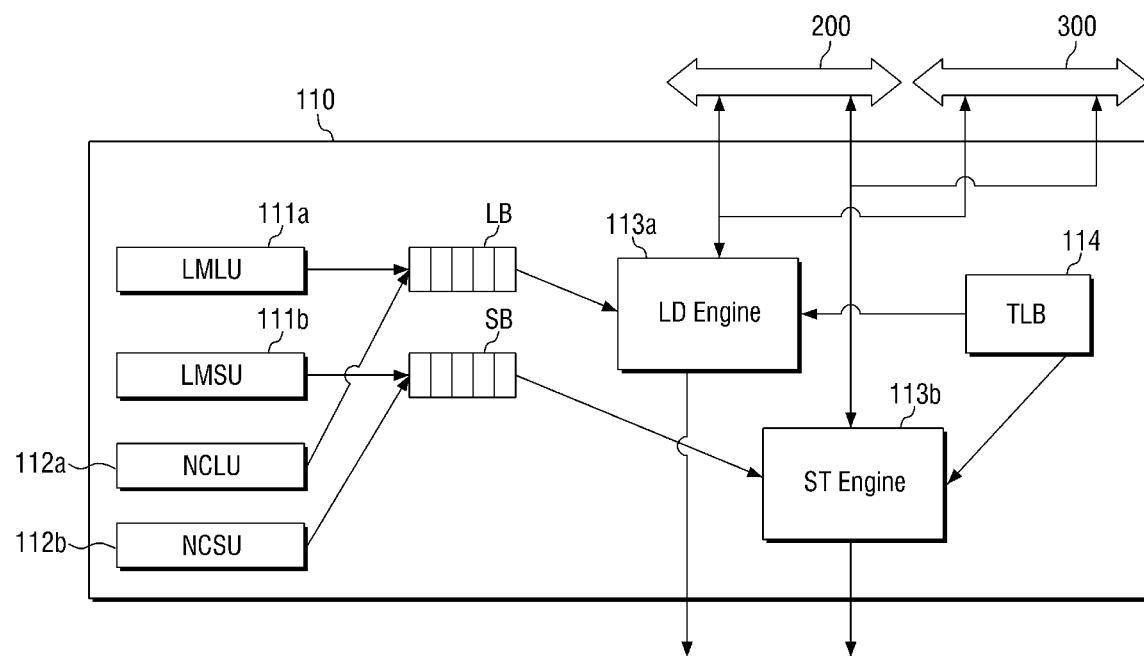
FIG. 7 is a block diagram for illustrating the LSU of FIG. 6.

FIG. 7 is a block diagram for illustrating the LSU of FIG. 6.

Referring to FIG. 7, the LSU 110 may include a local memory load unit (LMLU) 111*a*, a local memory store unit (LMSU) 111*b*, a neural core load unit (NCLU) 112*a*, a neural core store unit (NCSU) 112*b*, a load buffer LB, a store buffer SB, a load (LD) engine 113*a*, a store (ST) engine 113*b*, and a translation lookaside buffer (TLB) 114.

The local memory load unit 111*a* may fetch a load instruction for the local memory 120 and issue the load instruction. When the local memory load unit 111*a* provides the issued load instruction to the load buffer LB, the load buffer LB may sequentially transmit memory access requests to the load engine 113*a* according to the inputted order.

Further, the local memory store unit 111*b* may fetch a store instruction for the local memory 120 and issue the store instruction. When the local memory store unit 111*b* provides the issued store instruction to the store buffer SB, the store buffer SB may sequentially transmit memory access requests to the store engine 113*b* according to the inputted order.

The neural core load unit 112*a* may fetch a load instruction for the neural core 100 and issue the load instruction. When the neural core load unit 112*a* provides the issued load instruction to the load buffer LB, the load buffer LB may sequentially transmit memory access requests to the load engine 113a according to the inputted order.

In addition, the neural core store unit 112b may fetch a store instruction for the neural core 100 and issue the store instruction. When the neural core store unit 112b provides the issued store instruction to the store buffer SB, the store buffer SB may sequentially transmit memory access requests to the store engine 113b according to the inputted order.

The load engine 113a may receive the memory access request and retrieve data via the local interconnection 200. At this time, the load engine 113a may quickly find the data by using a translation table of a physical address and a virtual address that has been used recently in the translation lookaside buffer 114. If the virtual address of the load engine 113a is not in the translation lookaside buffer 114, the address translation information may be found in another memory.

The store engine 113b may receive the memory access request and retrieve data via the local interconnection 200. At this time, the store engine 113b may quickly find the data by using a translation table of a physical address and a virtual address that has been used recently in the translation lookaside buffer 114. If the virtual address of the store engine 113b is not in the translation lookaside buffer 114, the address translation information may be found in another memory.

The load engine 113a and the store engine 113b may send synchronization signals to the L2 sync path 300. At this time, the synchronization signal may indicate that the task has been completed.

Referring to FIG. 6 again, the local memory 120 is a memory located inside the neural core 100, and may receive all input data required for the tasks by the neural core 100 from the outside and store them temporarily. In addition, the local memory 120 may temporarily store the output data calculated by the neural core 100 for transmission to the outside. The local memory 120 may serve as a cache memory of the neural core 100.

The local memory 120 may transmit an input activation Act_In to the activation buffer 150 via the activation LSU 140 and receive an output activation Act_Out from the activation buffer 150 via the activation LSU 140. The local memory 120 may directly transmit and receive data to and from the processing unit 160 as well as the activation LSU 140. In other words, the local memory 120 may exchange data with each of a PE array and a vector unit as described below.

The local memory 120 may be a memory associated with the neural core level, i.e., level 1 (L1). Accordingly, the local memory 120 may also be defined as an L1 memory. The L1 memory may not be shared but be a private memory of the neural core, unlike the L2 shared memory 400 and the L3 shared memory, i.e., the shared memory 2000.

The local memory 120 may transmit data such as activations or weights via a data path. The local memory 120 may exchange synchronization signals via an L1 sync path, which is a separate dedicated path. The local memory 120 may exchange synchronization signals with, for example, the LSU 110, the weight buffer 130, the activation LSU 140, and the processing unit 160 via the L1 sync path.

The weight buffer 130 may receive a weight from the local memory 120. The weight buffer 130 may transfer the weight to the processing unit 160. The weight buffer 130 may temporarily store the weight before transferring it.

The input activation Act_In and the output activation Act_Out may refer to input values and output values of the layers of a neural network, respectively. In this case, if there are a plurality of layers in the neural network, the output value of the previous layer becomes the input value of the next layer, and thus, the output activation Act_Out of the previous layer may be utilized as the input activation Act_In of the next layer.

The weight may refer to a parameter that is multiplied by the input activation Act_In inputted in each layer. The weight is updated in the deep learning training stage, and may be used to derive the output activation Act_Out via the updated value in the inference stage.

The activation LSU 140 may transfer the input activation Act_In from the local memory 120 to the activation buffer 150, and the output activation Act_Out from the activation buffer 150 to the on-chip buffer. In other words, the activation LSU 140 may perform both a load task and a store task of the activation.

The activation buffer 150 may provide the input activation Act_In to the processing unit 160 and receive the output activation Act_Out from the processing unit 160. The activation buffer 150 may temporarily store the input activation Act_In and the output activation Act_Out.

The activation buffer 150 may quickly provide the activation to the processing unit 160, in particular, the PE array, which has a large amount of calculation, and may quickly receive the activation, thereby increasing the calculation speed of the neural core 100.

The processing unit 160 may be a module that performs calculations. The processing unit 160 may perform not only one-dimensional calculations but also two-dimensional matrix calculations, i.e., convolution operations. The processing unit 160 may receive an input activation Actin, multiply it by a weight, and then add it to generate an output activation Act_Out.

Figure 8:
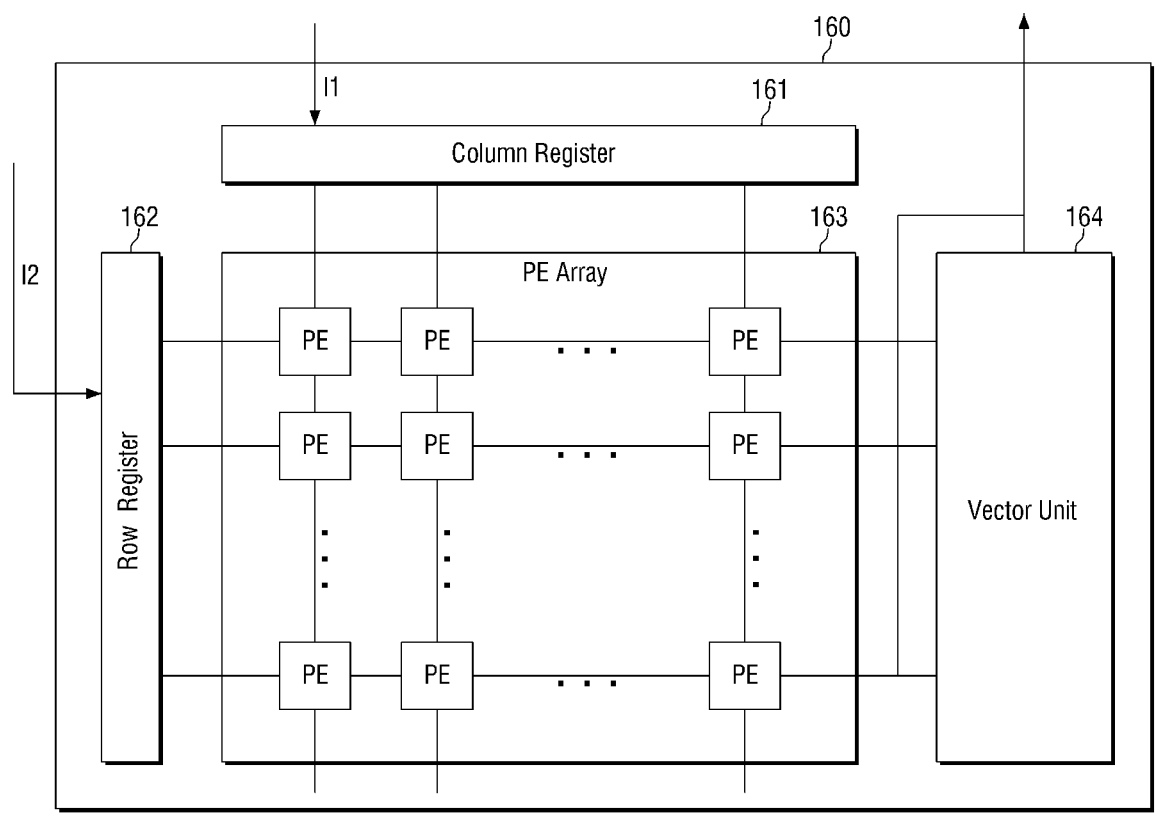
FIG. 8 is a block diagram for illustrating the processing unit of FIG. 6.

FIG. 8 is a block diagram for illustrating the processing unit of FIG. 6.

Referring to FIG. 6 and FIG. 8, the processing unit 160 may include a PE array 163, a vector unit 164, a column register 161, and a row register 162.

The PE array 163 may receive the input activation Act_In and the weight and perform multiplication on them. In this case, each of the input activation Act_In and the weight may be in the form of matrices and calculated via convolution. Through this, the PE array 163 may generate an output activation Act_Out. However, the present embodiment is not limited thereto. The PE array 163 may generate any types of outputs other than the output activation Act_Out as well.

The PE array 163 may include at least one processing element PE. The processing elements PE may be aligned with each other so that each of the processing elements PE may perform multiplication on one input activation Act_In and one weight.

The PE array 163 may sum values for each multiplication to generate a subtotal. This subtotal may be utilized as an output activation Act_Out. The PE array 163 performs two-dimensional matrix multiplication, and thus, may be referred to as a 2D matrix compute unit.

The vector unit 164 may mainly perform one-dimensional calculations. The vector unit 164, together with the PE array 163, may perform deep learning calculations. Through this, the processing unit 160 may be specialized for necessary calculations. In other words, each of the at least one neural core 100 has calculation modules that perform a large amount of two-dimensional matrix multiplications and one-dimensional calculations, and thus, can efficiently perform deep learning tasks.

The column register 161 may receive a first input I1. The column register 161 may receive the first input I1, and distribute them to each column of the processing elements PE.

The row register 162 may receive a second input I2. The row register 162 may receive the second input I2, and distribute them to each row of the processing elements PE.

The first input I1 may be an input activation Act_In or a weight. The second input I2 may be a value other than the first input I1 between the input activation Act_In or the weight. Alternatively, the first input I1 and the second input I2 may be values other than the input activation Act_In and the weight.

Figure 9:
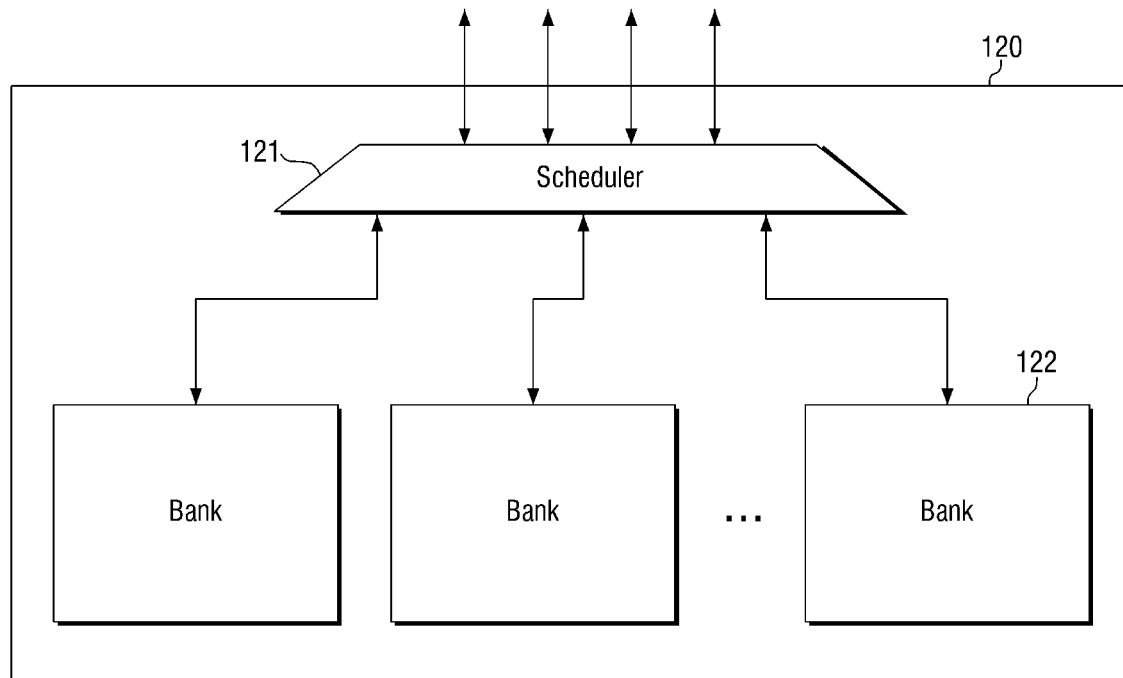
FIG. 9 is a block diagram for illustrating the local memory of FIG. 6.

FIG. 9 is a block diagram for illustrating the local memory of FIG. 6.

Referring to FIG. 9, the local memory 120 may include a scheduler 121 and at least one local memory bank 122.

When data is stored in the local memory 120, the scheduler 121 may receive the data from the load engine 113a. In this case, the at least one local memory bank 122 may be allocated to the data in a round robin. Accordingly, the data may be stored in any one of the at least one local memory bank 122.

Conversely, when the data is loaded from the local memory 120, the scheduler 121 may receive the data from the at least one local memory bank 122 and transfer them to the store engine 113b. The store engine 113b may store data externally via the local interconnection 200.

Figure 10:
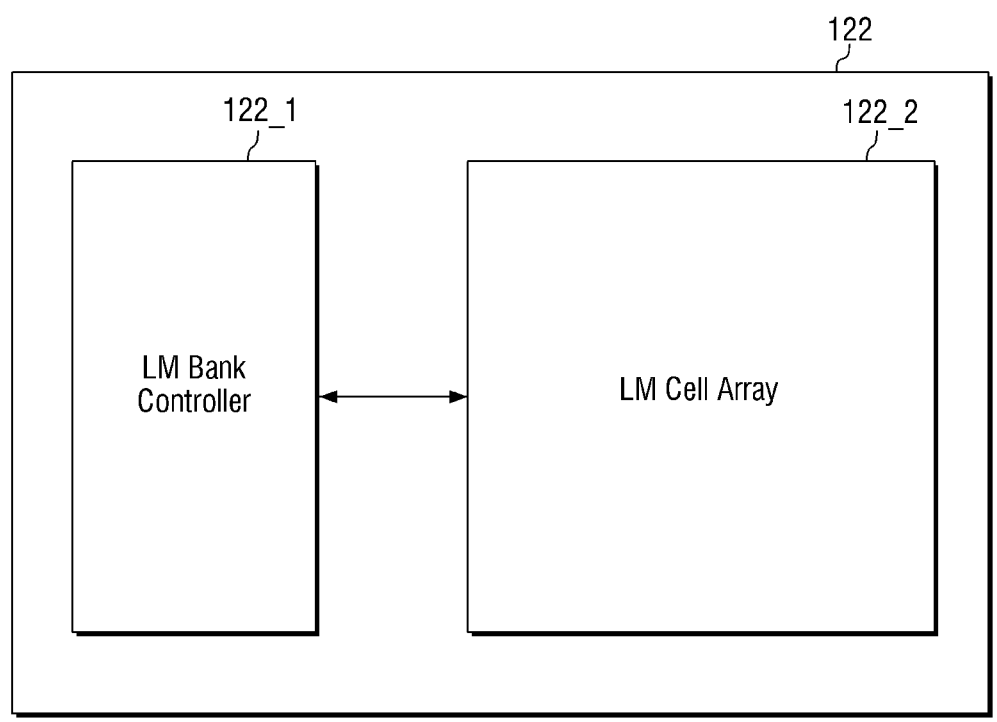
FIG. 10 is a block diagram for illustrating the local memory bank of FIG. 9.

FIG. 10 is a block diagram for illustrating the local memory bank of FIG. 9.

Referring to FIG. 10, the local memory bank 122 may include a local memory bank controller 122_1 and a local memory bank cell array 122_2.

The local memory bank controller 122_1 may manage read and write operations via the addresses of data stored in the local memory bank 122. In other words, the local memory bank controller 122_1 may manage the input/output of data as a whole.

The local memory bank cell array 122_2 may be of a structure in which cells in which data is directly stored are arranged in rows and columns. The local memory bank cell array 122_2 may be controlled by the local memory bank controller 122_1.

Figure 11:
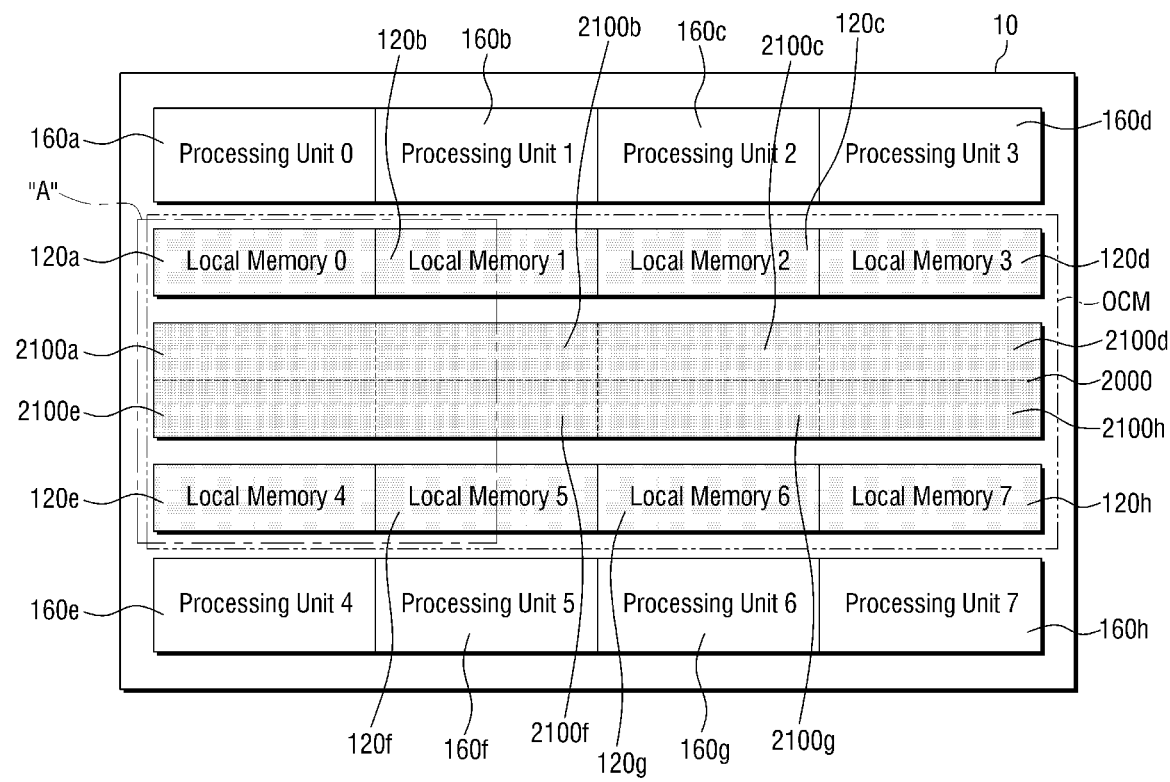
FIG. 11 is a block diagram for illustrating memory reconstruction of a neural processing system in accordance with some embodiments.

FIG. 11 is a block diagram for illustrating memory reconstruction of a neural processing system in accordance with some embodiments.

Referring to FIG. 11, the neural core SoC 10 may include first to eighth processing units 160a to 160h and an on-chip memory OCM. Although FIG. 11 illustrates eight processing units as an example, this is merely illustrative, and the number of processing units may vary as desired.

The on-chip memory OCM may include first to eighth local memories 120a to 120h and a shared memory 2000.

The first to eighth local memories 120a to 120h may be used as dedicated memories for the first to eighth processing units 160a to 160h, respectively. In other words, the first to eighth processing units 160a to 160h and the first to eighth local memories 120a to 120h may match 1:1 to each other.

The shared memory 2000 may include first to eighth memory units 2100a to 2100h. The first to eighth memory units 2100a to 2100h may correspond to the first to eighth processing units 160a to 160h, respectively, and may correspond to the first to eighth local memories 120a to 120h, respectively. That is, the number of memory units may be eight, which is the same as the number of processing units and is the same as the number of local memories.

The shared memory 2000 may operate in either one of two on-chip memory types. In other words, the shared memory 2000 may operate in one of a local memory type or a global memory type. That is, the shared memory 2000 may implement two types of logical memories with one piece of hardware.

If the shared memory 2000 is implemented in the local memory type, the shared memory 2000 may operate as a private memory for each of the first to eighth processing units 160a to 160h, just like the first to eighth local memories 120a to 120h. The local memory can operate at a relatively higher clock speed compared with the global memory, and the shared memory 2000 may also use a relatively higher clock speed when operating in the local memory type.

If the shared memory 2000 is implemented in the global memory type, the shared memory 2000 may operate as a common memory used by the first processing unit 160a and the second processing unit 160b together. In this case, the shared memory 2000 may be shared not only by the first to eighth processing units 160a to 160h but also by the first to eighth local memories 120a to 120h.

The global memory may generally use a lower clock compared with the local memory, but is not limited thereto. When the shared memory 2000 operates in the global memory type, the first to eighth processing units 160a to 160h may share the shared memory 2000. In this case, the shared memory 2000 may be connected to the volatile memory 32 of FIG. 2 via the global interconnection 6000 and may also operate as a buffer for the volatile memory 32.

At least a part of the shared memory 2000 may operate in the local memory type, and the rest may operate in the global memory type. In other words, the entire shared memory 2000 may operate in the local memory type, or the entire shared memory 2000 may operate in the global memory type. Alternatively, a part of the shared memory 2000 may operate in the local memory type, and the rest may operate in the global memory type.

Figure 12:
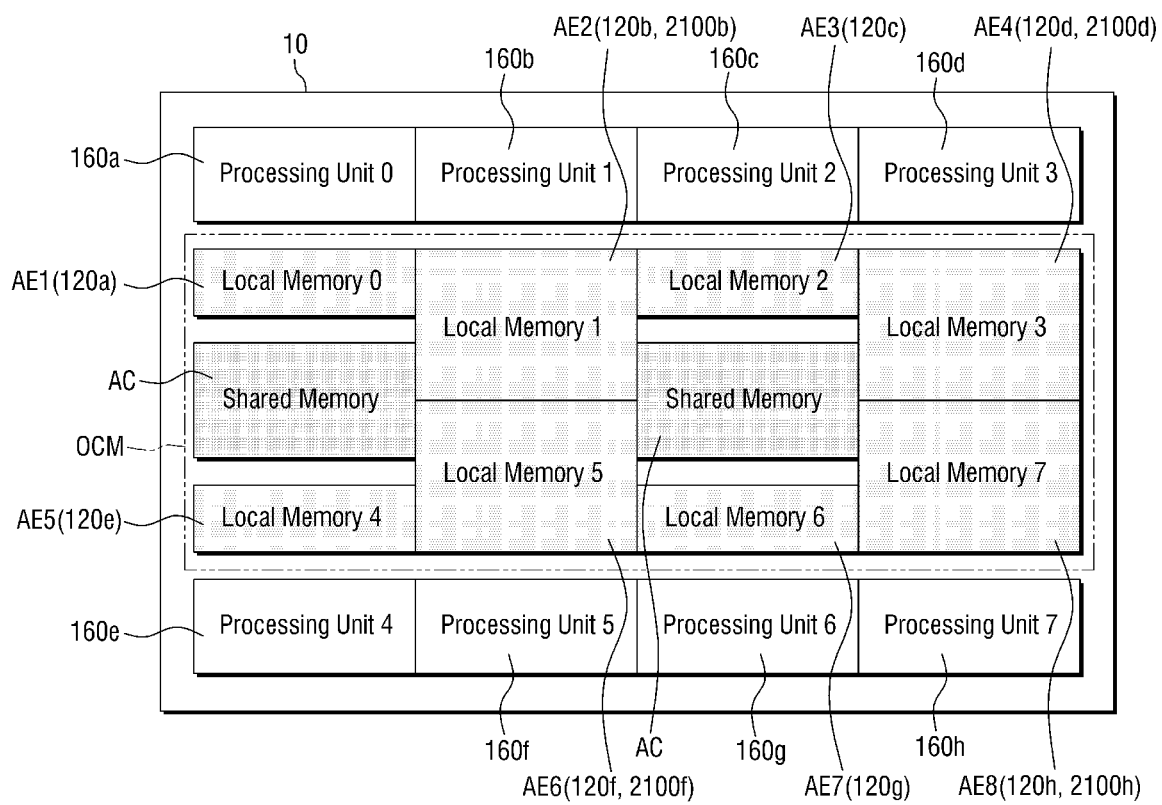
FIG. 12 is a block diagram showing an example of memory reconstruction of a neural processing system in accordance with some embodiments.

FIG. 12 is a block diagram showing an example of memory reconstruction of a neural processing system in accordance with some embodiments.

Referring to FIGS. 11 and 12, first, third, fifth, and seventh dedicated areas AE1, AE3, AE5, and AE7 associated respectively with the first, third, fifth, and seventh processing units 160a, 160c, 160e, and 160g may include only the first, third, fifth, and seventh local memories 120a, 120c, 120e, and 120g, respectively. Further, second, fourth, sixth, and eighth dedicated areas AE2, AE4, AE6, and AE8 associated respectively with the second, fourth, sixth, and eighth processing units 160b, 160d, 160f, and 160h may include second, fourth, sixth, and eighth local memories 120b, 120d, 120f, and 120h, respectively. In addition, the second, fourth, sixth, and eighth dedicated areas AE2, AE4, AE6, and AE8 may include the second, fourth, sixth, and eighth memory units 2100b, 2100d, 2100f, and 2100h. The first, third, fifth, and seventh memory units 2100a, 2100c, 2100e, and 2100g of the shared memory 2000 may be used as a common area AC.

The common area AC may be a memory shared by the first to eighth processing units 160a to 160h. The second dedicated area AE2 may include a second local memory 120b and a second memory unit 2100b. The second dedicated area AE2 may be an area in which the second local memory 120b and the second memory unit 210b that are separated hardware-wise operate in the same manner and operate logically as one local memory. The fourth, sixth, and eighth dedicated areas AE4, AE6, and AE8 may also operate in the same manner, respectively, as the second dedicated area AE2.

The shared memory 2000 in accordance with the present embodiment may convert an area corresponding to each neural core into a logical local memory and a logical global memory at an optimized ratio and may use them. The shared memory 2000 may perform the adjustment of this ratio at runtime.

In other words, each processing unit may perform the same task in some cases, but may perform different tasks in other cases as well. In this case, the amount of the local memory and the amount of the global memory required for the tasks carried out by each processing unit are inevitably different each time. Accordingly, if the composition ratio of the local memory and the shared memory is fixedly set as in the conventional on-chip memory, there may occur inefficiency due to the calculation tasks assigned to each processing unit.

Therefore, the shared memory 2000 of the neural processing device in accordance with the present embodiment may set an optimal ratio of the local memory and the global memory according to calculation tasks during the runtime, and may improve the efficiency and speed of calculation.

Figure 13:
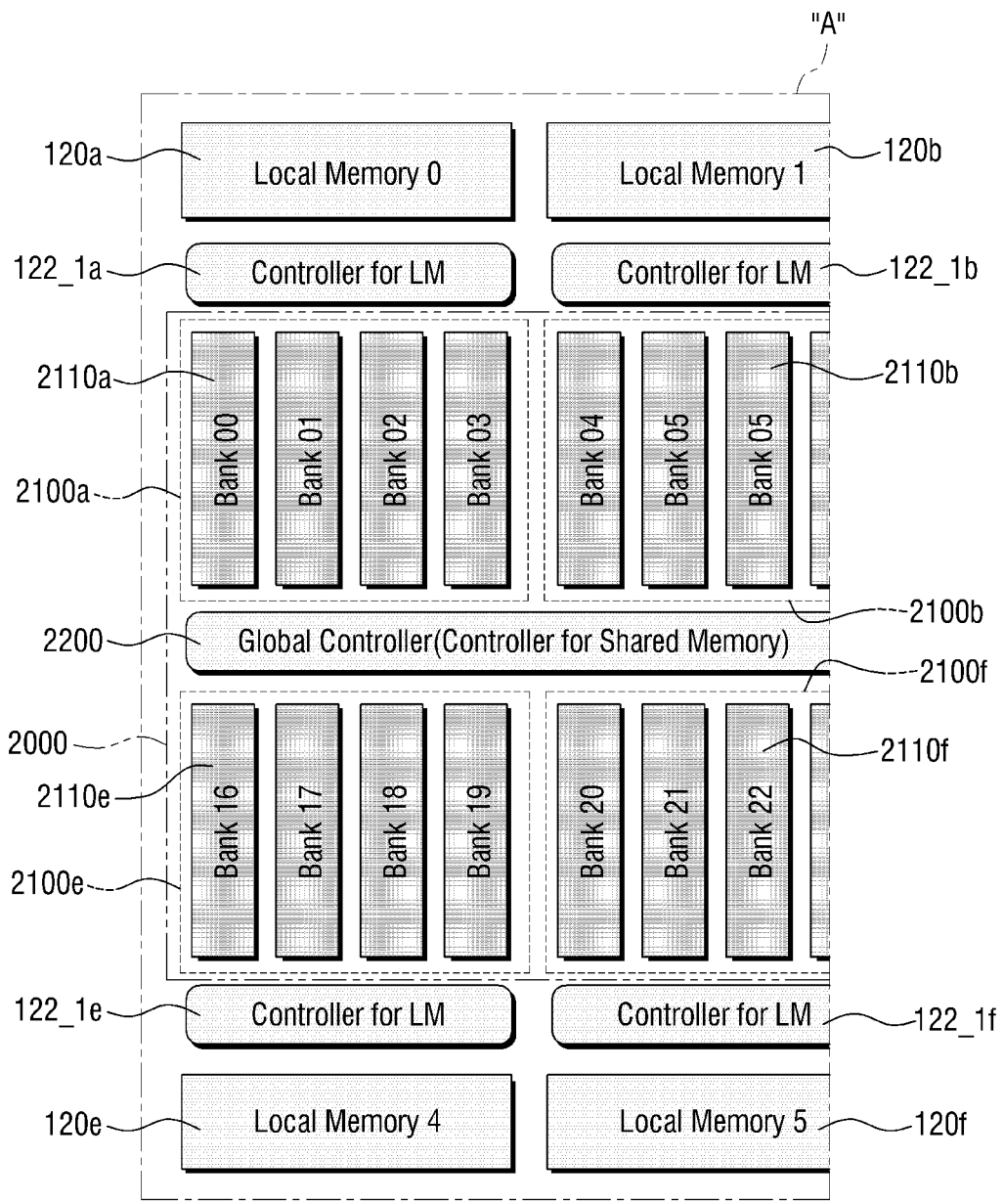
FIG. 13 is an enlarged block diagram of a portion A of FIG. 11.

FIG. 13 is an enlarged block diagram of a portion A of FIG. 11.

Referring to FIGS. 11 and 13, the shared memory 2000 may include a first local memory controller 122_1a, a second local memory controller 122_1b, a fifth local memory controller 122_1e, a sixth local memory controller 122_1f, the first to eighth memory units 2100a to 2100h, and a global controller 2200. Other local memory controllers not shown may also be included in the present embodiment, but the description thereof will be omitted for convenience.

The first local memory controller 122_1a may control the first local memory 120a. In addition, the first local memory controller 122_1a may control the first memory unit 2100a. Specifically, when the first memory unit 2100a is implemented in a logical local memory type, the first local memory controller 122_1a may control the first memory unit 2100a.

The second local memory controller 122_1b may control the second local memory 120b. Further, the second local memory controller 122_1b may control the second memory unit 2100b. In other words, when the second memory unit 2100b is implemented in the logical local memory type, the first local memory controller 122_1a may control the second memory unit 2100b.

The fifth local memory controller 122_1e may control the fifth local memory 120e. Further, the fifth local memory controller 122_1e may control the fifth memory unit 2100e. In other words, when the fifth memory unit 2100e is implemented in the logical local memory type, the fifth local memory controller 122_1e may control the fifth memory unit 2100e.

The sixth local memory controller 122_1f may control the sixth local memory 120f. Further, the sixth local memory controller 122_1f may control the sixth memory unit 2100f. In other words, when the sixth memory unit 2100f is implemented in the logical local memory type, the sixth local memory controller 122_1f may control the sixth memory unit 2100f.

The global controller 2200 may control all of the first to eighth memory units 2100a to 2100h. Specifically, the global controller 2200 may control, among the first to eighth memory unit 2100a to 2100h, memory units logically operating in the global memory type (i.e., when they do not operate logically in the local memory type).

In other words, the first to eighth memory units 2100a to 2100h may be controlled by the first to eighth local memory controllers 122_1a to 122_1h, respectively, or may be controlled by the global controller 2200, depending on what type of memory they are logically implemented in.

If the local memory controllers including the first, second, fifth, and sixth local memory controllers 122_1a, 122_1b, 122_1e, and 122_1f control the first to eighth memory units 2100a to 2100h, respectively, the local memory controllers control the first to eighth memory units 2100a to 2100h in the same manner as the first to eighth local memories 120a to 120h, and thus, can control them as the dedicated memory of the first to eighth processing units 160a to 160h. In some embodiments, if the i-th local memory controller controls the i-th memory unit, the i-th local memory controller controls the i-th memory unit in the same manner as it controls the i-th local memory, and thus, can control the i-th memory unit as the dedicated memory of the i-th processing unit. Accordingly, the first to eighth memory units 2100a to 2100h may operate at clock frequencies corresponding to the clock frequencies of the first to eighth processing units 160a to 160h, respectively.

Each of the local memory controllers including the first local memory controller 122_1a, the second local memory controller 122_1b, the fifth local memory controller 122_1e, and the sixth local memory controller 122_1f may include the LSU 110 of FIG. 6.

If the global controller 2200 controls at least one of the first to eighth memory units 2100a to 2100h, respectively, then the global controller 2200 may control the first to eighth memory units 2100a to 2100h as the global memory of the first to eighth processing units 160a to 160h, respectively. Accordingly, at least one of the first to eighth memory units 2100a to 2100h may operate at a clock frequency independent of the clock frequencies of the first to eighth processing units 160a to 160h, respectively. In some embodiments, if the global controller 2200 controls the i-th memory unit among the first to eighth memory units 2100a to 2100h, the global controller 2200 may control the i-th memory unit as the global memory of the i-th processing unit, and the i-th memory unit may operate at a clock frequency independent of the clock frequency of the i-th processing unit. However, the present embodiment is not limited thereto.

The global controller 2200 may connect the first to eighth memory units 2100a to 2100h with the global interconnection 6000 of FIG. 3. The first to eighth memory units 2100a to 2100h may exchange data with the off-chip memory 30 of FIG. 1 or may exchange data with the first to eighth local memories 120a to 120h, respectively, by means of the global controller 2200.

Each of the first to eighth memory units 2100a to 2100h may include at least one memory bank. The first memory unit 2100a may include at least one first memory bank 2110a. The first memory banks 2110a may be areas obtained by dividing the first memory unit 2100a into certain sizes. The first memory banks 2110a may all be memory devices of the same size. However, the present embodiment is not limited thereto. FIG. 13 illustrates that four memory banks are included in one memory unit.

Similarly, the second, fifth, and sixth memory units 2100b, 2100e, and 2100f may include at least one second, fifth, and sixth memory banks 2110b, 2110e, and 2110f, respectively.

In the following, the description will be made based on the first memory banks 2110a and the fifth memory banks 2110e, which may be the same as other memory banks including the second and sixth memory banks 2110b and 2110f.

Each the first memory banks 2110a may operate logically in the local memory type or operate logically in the global memory type. In this case, the first memory banks 2110a may operate independently of the other memory banks in the first memory unit 2100a. However, the present embodiment is not limited thereto.

If each memory bank operates independently, the first memory unit 2100a may include a first area operating in the same manner as the first local memory 120a and a second area operating in a different manner from the first local memory 120a. In this case, the first area and the second area do not necessarily coexist, but any one area may occupy the entire first memory unit 2100a.

Likewise, the second memory unit 2100b may include a third area operating in the same manner as the second local memory 120b and a fourth area operating in a different manner from the second local memory 120b. In this case, the third area and the fourth area do not necessarily coexist, and any one area may occupy the entire first memory unit 2100a.

In this case, the ratio of the first area to the second area may be different from the ratio of the third area to the fourth area. However, the present embodiment is not limited thereto. Therefore, the ratio of the first area to the second area may be the same as the ratio of the third area to the fourth area. In other words, the memory composition ratio in each memory unit may vary as desired.

In general, in the case of the conventional system on a chip, the on-chip memory except for high-speed local memory was often composed of high-density, low-power SRAM. This is because SRAM has high efficiency in terms of chip area and power consumption relative to required capacity. However, with the conventional on-chip memory, the processing speed slowed down significantly inevitably in the case of tasks that require more data quickly than the predetermined capacity of the local memory. Even when the need for the global memory is not high, there is no way to utilize the remaining global memory, resulting in inefficiency.

On the other hand, the shared memory 2000 in accordance with some embodiments may be controlled selectively by any one of the two controllers depending on the cases. In this case, the shared memory 2000 may be controlled not only as a whole by a determined one of the two controllers but also independently for each memory unit or each memory bank.

Therefore, the shared memory 2000 in accordance with the present embodiment may obtain an optimal memory composition ratio for calculation tasks during the runtime to perform faster and more efficient calculation tasks. In the case of a processing unit specialized in artificial intelligence, the required sizes of local memory and global memory may vary for each particular application. Moreover, even for the same application, the required sizes of local memory and global memory may vary for each layer when a deep learning network is used. In the shared memory 2000 in accordance with the present embodiment, the composition ratio of the memory can be changed during the runtime even when calculation steps change for each layer, making fast and efficient deep learning tasks possible.

Figure 14:
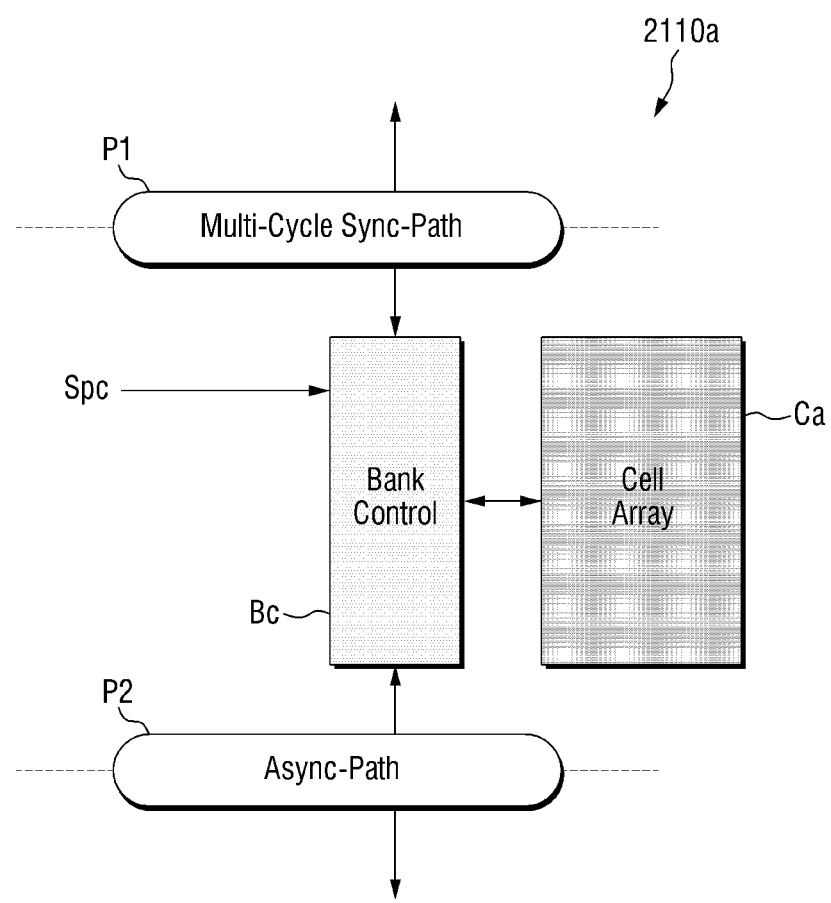
FIG. 14 is a diagram for illustrating the first bank of FIG. 13.

FIG. 14 is a diagram for illustrating the first bank of FIG. 13. Although FIG. 14 illustrates the first memory bank 2110a, other memory banks may also have the same structure as the first memory bank 2110a.

Referring to FIG. 14, the first memory bank 2110a may include a cell array Ca, a bank controller Bc, a first path unit P1, and a second path unit P2.

The cell array Ca may include a plurality of memory devices (cells) therein. In the cell array Ca, the plurality of memory devices may be arranged in a lattice structure. The cell array Ca may be, for example, a SRAM (static random-access memory) cell array.

The bank controller Bc may control the cell array Ca. The bank controller Bc may determine whether the cell array Ca operates in the local memory type or in the global memory type, and may control the cell array Ca according to the determined memory type.

Specifically, the bank controller Bc may determine whether to transmit and receive data in the direction of the first path unit P1 or to transmit and receive data in the direction of the second path unit P2 during the runtime. The bank controller Bc may determine a data transmission and reception direction according to a path control signal Spc.

The path control signal Spc may be generated by a pre-designed device driver or compiler. The path control signal Spc may be generated according to the characteristics of calculation tasks. Alternatively, the path control signal Spc may be generated by an input received from a user. In other words, the user may directly apply an input to the path control signal Spc in order to select optimal memory composition ratio.

The bank controller Bc may determine a path along which the data stored in the cell array Ca are transmitted and received via the path control signal Spc. The exchange interface of data may be changed as the bank controller Bc determines the path along which the data are transmitted and received. In other words, a first interface may be used when the bank controller Bc exchanges data with the first path unit P1, and a second interface may be used when the bank controller Bc exchanges data with the second path unit P2. In this case, the first interface and the second interface may be different from each other.

Also, address systems in which data are stored may vary as well. In other words, if a particular interface is selected, then read and write operations may be performed in an address system corresponding thereto.

The bank controller Bc may operate at a particular clock frequency. For example, if the cell array Ca is an SRAM cell array, the bank controller Bc may operate at the operating clock frequency of a general SRAM.

The first path unit P1 may be connected to the bank controller Bc. The first path unit P1 may directly exchange the data of the cell array Ca with the first processing unit 160a. In this case, "directly" may mean being exchanged with each other without going through the global interconnection 6000. In other words, the first processing unit 160a may exchange data directly with the first local memory 120a, and the first processing unit 160a may exchange data via the first path unit P1 when the shared memory 2000 is implemented logically in the local memory type. The first path unit P1 may include local memory controllers including the first local memory controller 122_1a and the second local memory controller 122_1b as shown in FIG. 13.

The first path unit P1 may form a multi-cycle sync-path. In other words, the operating clock frequency of the first path unit P1 may be the same as the operating clock frequency of the first processing unit 160a. The first local memory 120a may quickly exchange data at the same clock frequency as the operating clock frequency of the first processing unit 160a in order to quickly exchange data at the same speed as the operation of the first processing unit 160a.

Likewise, the first path unit P1 may also operate at the same clock frequency as the operating clock frequency of the first processing unit 160a.

In this case, the operating clock frequency of the first path unit P1 may be multiples of the operating clock frequency of the bank controller Bc. In this case, a clock domain crossing (CDC) operation for synchronizing the clocks between the bank controller Bc and the first path unit P1 is not needed separately, and thus, a delay of data transmission may not occur. Accordingly, faster and more efficient data exchange can be possible.

In FIG. 14, the operating clock frequency of the first path unit P1 may be 1.5 GHz, as an example. This may be twice the frequency of 750 MHz of the bank controller Bc. However, the present embodiment is not limited thereto, and any may be possible as long as the first path unit P1 operates at integer multiples of the clock frequency of the bank controller Bc.

The second path unit P2 may be connected to the bank controller Bc. The second path unit P2 may exchange the data of the cell array Ca with the first processing unit 160a not directly but via the global interconnection 6000. In other words, the first processing unit 160a may exchange data with the cell array Ca via the global interconnection 6000 and the second path unit P2. In this case, the cell array Ca may exchange data not only with the first processing unit 160a but also with other processing units.

In other words, the second path unit P2 may be a data exchange path between the cell array Ca and all the processing units when the first memory bank 2110a is implemented logically in the global memory type. The second path unit P2 may include the global controller 2200 of FIG. 13.

The second path unit P2 may form an Async-Path. The operating clock frequency of the second path unit P2 may be the same as the operating clock frequency of the global interconnection 6000. Likewise, the second path unit P2 may also operate at the same clock frequency as the operating clock frequency of the global interconnection 6000.

In this case, the operating clock frequency of the second path unit P2 may not be synchronized with the operating clock frequency of the bank controller Bc. In this case, the clock domain crossing (CDC) operation for synchronizing the clocks between the bank controller Bc and the second path unit P2 may be required. If the operating clock frequency of the bank controller Bc and the operating clock frequency of the second path unit P2 are not synchronized with each other, the degree of freedom in the design of the clock domain may be relatively high. Therefore, the difficulty of hardware design is decreased, thereby making it possible to more easily derive the hardware operation.

The bank controller Bc may use different address systems in the case of exchanging data via the first path unit P1 and in the case of exchanging data via the second path unit P2. In other words, the bank controller Bc may use a first address system if via the first path unit P1 and a second address system if via the second path unit P2. In this case, the first address system and the second address system may be different from each other.

The bank controller Bc does not necessarily have to exist for each memory bank. In other words, the bank controller Bc is not a part for scheduling but serves to transfer signals, and thus, is not an essential part for each memory bank having two ports. Therefore, one bank controller Bc can control multiple memory banks. The multiple memory banks may operate independently even if they are controlled by the bank controller Bc. However, the present embodiment is not limited thereto.

As a matter of course, the bank controller Bc may exist for each memory bank. In this case, the bank controller Bc may control each memory bank individually.

Referring to FIG. 13 and FIG. 14, if the first memory unit 2100a exchanges data via the first path unit P1, the first address system may be used. If the first memory unit 2100a exchanges data via the second path unit P2, the second address system may be used. Similarly, if the second memory unit 2100b exchanges data via the first path unit P1, a third address system may be used. If the second memory unit 2100b exchanges data via the second path unit P2, the second address system may be used. In this case, the first address system and the third address system may be the same as each other. However, the present embodiment is not limited thereto.

The first address system and the third address system may each be used exclusively for the first processing unit 160a and the second processing unit 160b, respectively. The second address system may be commonly applied to the first processing unit 160a and the second processing unit 160b.

In FIG. 14, the operating clock frequency of the second path unit P2 may operate at 1 GHz, as an example. This may be a frequency that is not synchronized with the operating clock frequency of 750 MHz of the bank controller Bc. In other words, the operating clock frequency of the second path unit P2 may be freely set without being dependent on the operating clock frequency of the bank controller Bc at all.

A generic global memory has used slow SRAM (e.g., 750 MHz) and a global interconnection (e.g., 1 GHz) faster than that, inevitably resulting in delays due to the CDC operation. On the other hand, the shared memory 2000 in accordance with some embodiments has room to use the first path unit P1 in addition to the second path unit P2, thereby making it possible to avoid delays resulting from the CDC operation.

Furthermore, in the generic global memory, a plurality of processing units use one global interconnection 6000, and thus, when the amount of data transfer occurs at the same time, the decrease in the overall processing speed is likely to occur. On the other hand, the shared memory 2000 in accordance with some embodiments has room to use the first path unit P1 in addition to the second path unit P2, thereby making it possible to achieve the effect of properly distributing the data throughput that could be concentrated on the global controller 2200 as well.

Figure 15:
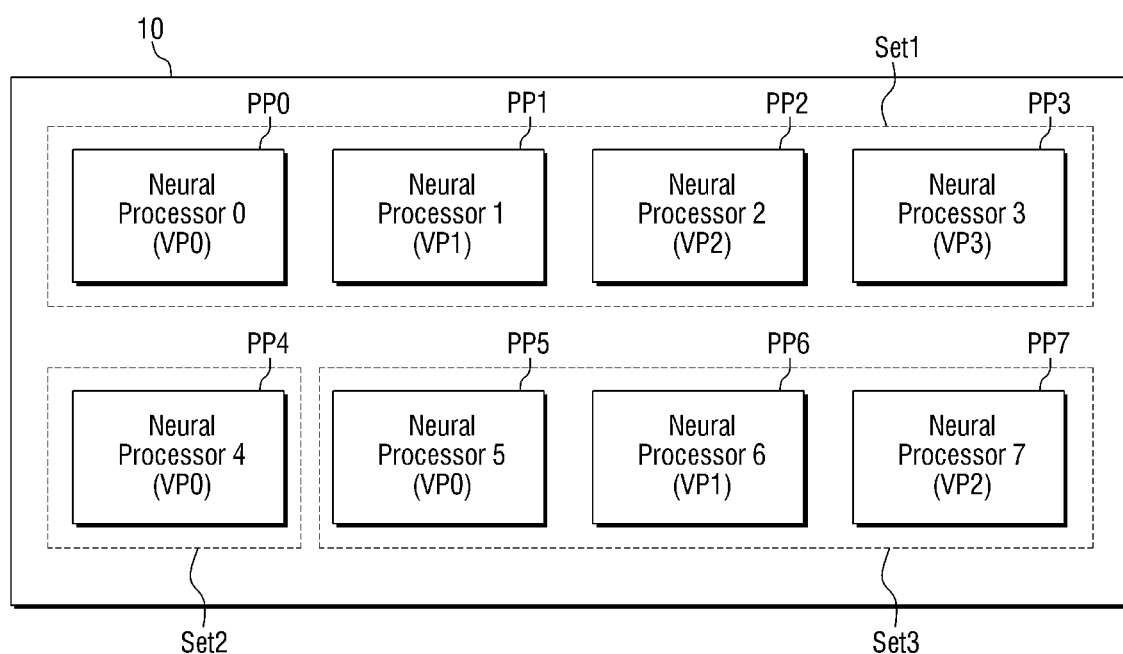
FIG. 15 is a conceptual diagram for illustrating virtual ID allocation of a neural processing device in accordance with some embodiments.

FIG. 15 is a conceptual diagram for illustrating virtual ID allocation of a neural processing device in accordance with some embodiments.

Referring to FIG. 15, the neural core SoC 10 may include a plurality of neural processors. FIG. 15 illustrates, for example, a case where there are eight neural processors. The neural core SoC 10 may include first to eighth neural processors PP0 to PP7.

In this case, the first to fourth neural processors PP0 to PP3 may divide and perform one task by means of the same program. The fifth neural processor PP4 may perform other one task alone, and the sixth to eighth neural processors PP5 to PP7 may divide and perform the other task.

In other words, the eight neural processors may be divided into three sets. In this case, a first set Set1 may include the first to fourth neural processors PP0 to PP3. A second set Set2 may include the fifth neural processor PP4. A third set Set3 may include the sixth to eighth neural processors PP5 to PP7.

New virtual IDs may be assigned in each set. In other words, first to fourth virtual IDs VP0 to VP3 may be assigned to the first to fourth neural processors PP0 to PP3 of the first set Set1, respectively. The first virtual ID VP0 may be assigned to the fifth neural processor PP4 of the second set Set2. The first to third virtual IDs VP0 to VP2 may be assigned to the sixth to eighth neural processors PP5 to PP7 of the third set Set3.

Therefore, the same virtual IDs may be assigned to different neural processors when executing different programs, but the physical IDs (i.e., the unique ID of each neural processor) and the virtual IDs may match 1:1 to each other when executing the same program together.

Figure 16:
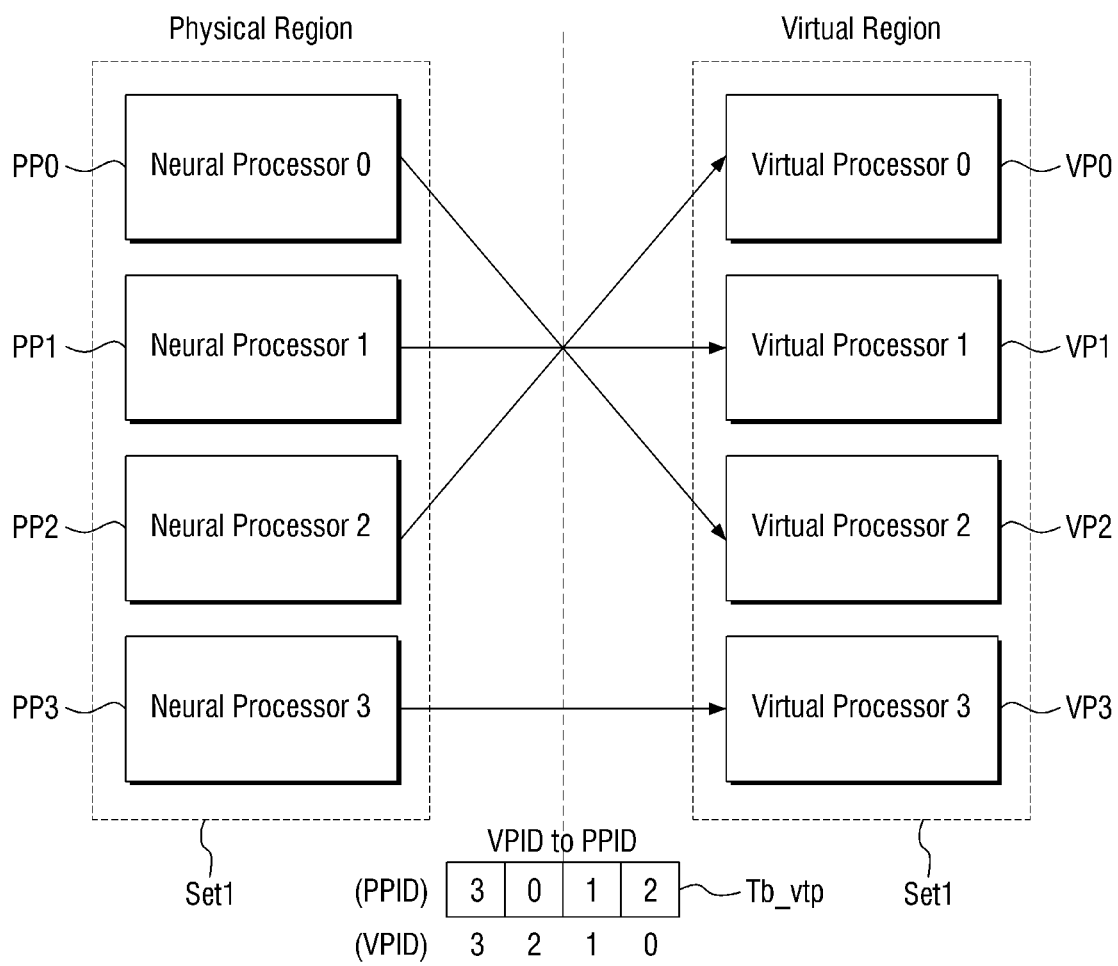
FIG. 16 is a diagram for illustrating virtual ID allocation and a VPID table of a neural processing device in accordance with some embodiments.

FIG. 16 is a diagram for illustrating virtual ID allocation and a VPID table of a neural processing device in accordance with some embodiments.

Referring to FIG. 16, a case in which the first to fourth neural processors PP0 to PP3 of the first set Set1 have been assigned the first to fourth virtual IDs VP0 to VP3 will be described. The order of the physical IDs and the virtual IDs may not be the same as each other. In other words, the first neural processor PP0 may be assigned the third virtual ID VP2 instead of the first virtual ID VP0. The second neural processor PP1 may be assigned the second virtual ID VP1, and the third neural processor PP2 may be assigned the first virtual ID VP0. The fourth neural processor PP3 may be assigned the fourth virtual ID VP3.

Accordingly, a VPID table TB_VTP may record physical IDs corresponding to virtual IDs. For example, if the values of 3, 0, 1, and 2 are sequentially recorded in the VPID table TB_VTP, it may be checked which physical IDs the first to fourth virtual IDs VP0 to VP3 correspond to in the reverse order, respectively.

Specifically, the neural processor to which the first virtual ID VP0 has been assigned is the third neural processor PP2 based on the number 2, and the neural processor to which the second virtual ID VP1 has been assigned is the second neural processor PP1 based on the number 1. The neural processor to which the third virtual ID VP2 has been assigned is the first neural processor PP0 based on the number 0, and the neural processor to which the fourth virtual ID VP3 has been assigned is the fourth neural processor PP3 based on the number 3.

Figure 17:
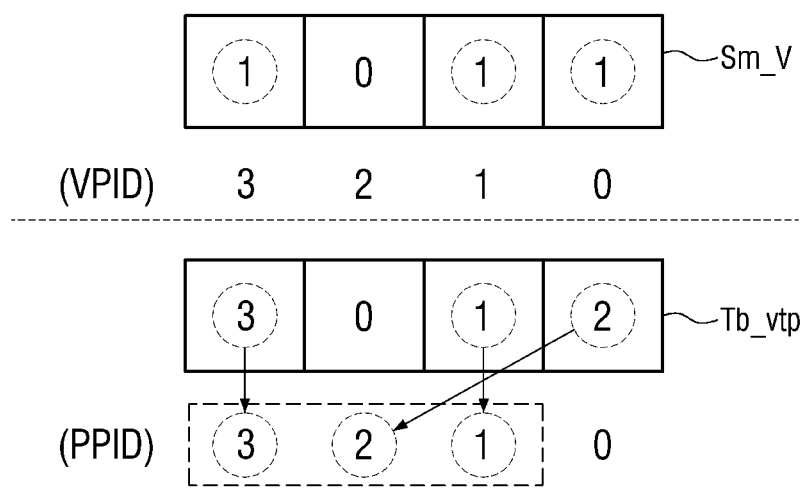
FIG. 17 is a diagram for illustrating a process of identifying a physical ID via a sync target and a VPID table.

FIG. 17 is a diagram for illustrating a process of identifying a physical ID via a sync target and a VPID table.

Referring to FIG. 17, an L3 sync target Sm_V may be a signal generated by each of the neural processors that transmit synchronization signals. That is, the L3 sync target Sm_V may include, for example, four fields. This may be due to the fact that there are four neural processors in the same set. The four fields of the L3 sync target Sm_V may correspond to the first to fourth virtual IDs VP0 to VP3, respectively. In other words, if values 1, 0, 1, and 1 are written in the L3 sync target Sm_V, then the values 1, 1, 0, and 1 may correspond to the first to fourth virtual IDs VP0 to VP3 in the reverse order, respectively.

The meaning of the '1' of the L3 sync target Sm_V may be an indication indicating whether a synchronization signal corresponding to the L3 sync target Sm_V needs to be transferred to the neural processor 1000 having the virtual ID corresponding to the indication. That is, the last value of the values 1, 0, 1, and 1 is 1, which may mean that the synchronization signal corresponding to the L3 sync target Sm_V needs to be transferred to the neural processor of the first virtual ID VP0. The third value in the values 1, 0, 1, and 1 is equal to 0, which may indicate that the synchronization signal corresponding to the L3 sync target Sm_V does not need to be transferred to the neural processor of the first virtual ID VP2. In other words, the values 1, 0, 1, and 1 may represent that the synchronization signal corresponding to the L3 sync target Sm_V needs to be transferred to the remaining three neural processors except for the neural processor of the third virtual ID VP2.

The neural processors to transmit the synchronization signal according to the L3 sync target Sm_V may check the physical IDs of the corresponding neural processors through the VPID table TB_VTP, after the virtual IDs of the neural processors to which the synchronization signal for the L3 sync target Sm_V needs to be transmitted have been identified as the first, second, and fourth virtual IDs VP0, VP1, and VP3 by the L3 sync target Sm_V. The neural processor may be able to check the actual address by checking the physical ID.

As the VPID table TB_VTP has values of 3, 0, 1, and 2, it can be seen that the physical IDs of the first, second, and fourth virtual IDs VP0, VP1, and VP3 are 2, 1, and 3, respectively. In other words, the second to fourth neural processors PP1 to PP3 may be the neural processors that receive the synchronization signal corresponding to the L3 sync target Sm_V.

Figure 18:
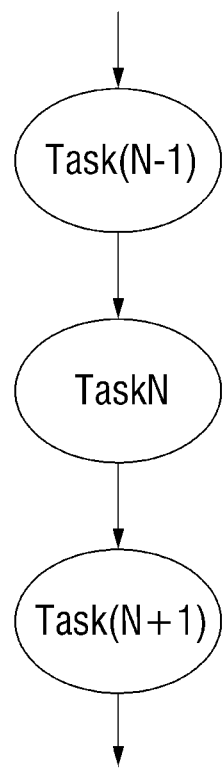
FIG. 18 is a directed acyclic graph for illustrating the sequence of deep learning tasks.

FIG. 18 is a directed acyclic graph for illustrating the sequence of deep learning tasks.

Referring to FIG. 18, the calculation tasks of a neural processing device in accordance with some embodiments may be represented via a directed acyclic graph. In this case, if the current task is represented as TaskN, the previous task may be Task(N−1) and the next task may be Task(N+1).

That is, in order for the current task TaskN to be performed, Task (N−1) needs to be finished. Similarly, to perform the next task Task (N+1), the current task TaskN needs to be completed.

Therefore, a synchronization signal indicating that each task is completed needs to be transmitted from the neural processor that has performed the task, and the synchronization signal may be determined by a dependency chain indicating which neural processor needs to perform the next task. Accordingly, the L3 sync target Sm_V may be an instruction in which information on a neural processor that is to perform the next task is written. When a value is written onto the L3 sync target Sm_V, a synchronization signal may be transmitted accordingly.

Figure 19:
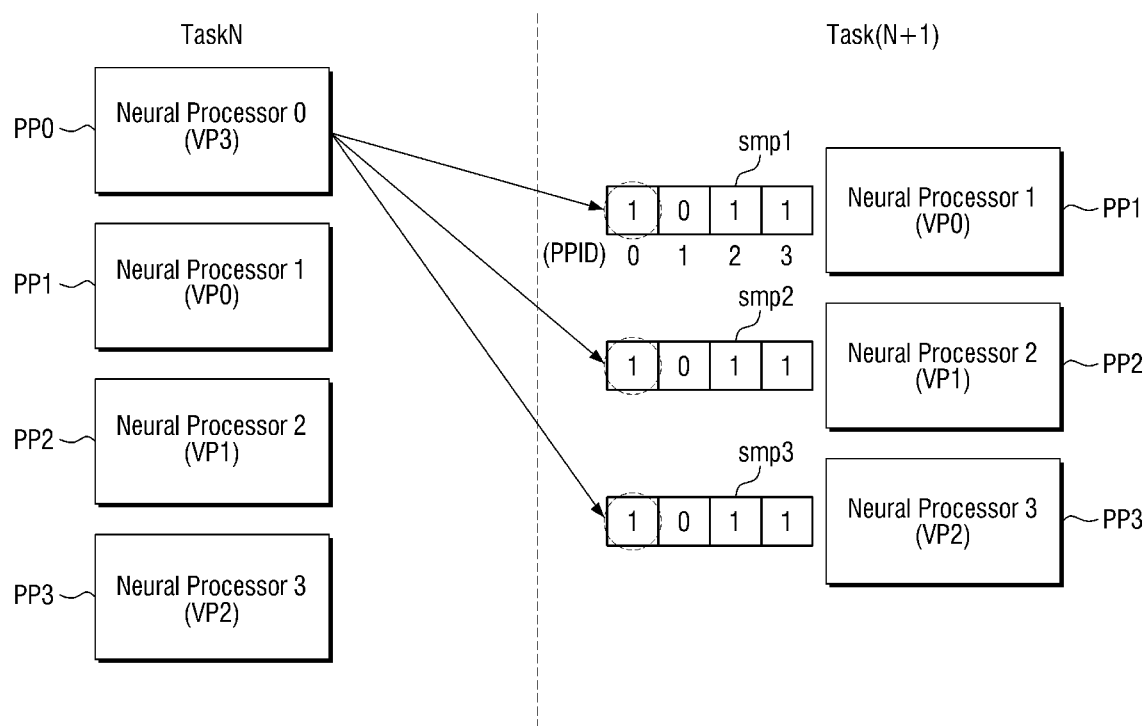
FIG. 19 is a conceptual diagram for illustrating an operation of transmitting a synchronization signal according to a sync target for L3 synchronization of a neural processing device in accordance with some embodiments.

FIG. 19 is a conceptual diagram for illustrating an operation of transmitting a synchronization signal according to a sync target for L3 synchronization of a neural processing device in accordance with some embodiments.

Referring to FIG. 19, the first neural processor PP0 may transmit a synchronization signal for the sync target Sm_V to the second to fourth neural processors PP1 to PP3. Through this, synchronization of the SoC level, i.e., level 3 (L3) may be performed.

A neural processing device in accordance with some embodiments may include first to third semaphore memories smp1 to smp3 corresponding to the second to fourth neural processors PP1 to PP3, respectively. The first to third semaphore memories smp1 to smp3 may be included in each of the second to fourth neural processors PP1 to PP3. The first to third semaphore memories smp1 to smp3 may have the same structure as each other. Therefore, the first semaphore memory smp1 will be mainly described in detail below.

The first semaphore memory smp1 may correspond to the second neural processor PP1. The first semaphore memory smp1 may include four fields corresponding, respectively, to the four neural processors included in the first set Set1.

For example, the first semaphore memory smp1 may include first to fourth fields, and the first to fourth fields may correspond to the first to fourth neural processors PP0 to PP3, respectively. In other words, the first to fourth fields may be arranged in the same order as the physical IDs of the first to fourth neural processors PP0 to PP3.

In other words, the first field of the first semaphore memory smp1 is a portion for the first neural processor PP0, and may be expressed as 1 if a synchronization signal for the L3 sync target Sm_V is received from the first neural processor PP0, and if not, may be expressed as 0. As a matter of course, it may also be possible to express in the opposite way.

Similarly, the values of first fields of the second semaphore memory smp2 and the third semaphore memory smp3 may also be expressed as 1 if the synchronization signal for the L3 sync target Sm_V is received from the first neural processor PP0. In this way, the values 1, 0, 1, and 1 of the first semaphore memory smp1 may indicate that the synchronization signal for the L3 sync target Sm_V is received by the first, third, and fourth neural processors PP0, PP2, and PP3.

If the current task TaskN is finished, the first neural processor PP0 may transmit a synchronization signal for the L3 sync target Sm_V through the L3 sync channel 6300 of FIG. 4 to start the next task Task(N+1). This synchronization may also be performed by other neural processors, respectively.

The synchronization task of the neural processing device of the present embodiment can be performed in parallel since there separately exists no control processor that controls centrally, thereby making it possible to minimize the latency. In addition, the overhead of scheduling that needs to take into account the task dependency due to such synchronization is not required, thereby making it possible to maximize the efficiency of the entire device.

Figure 20:
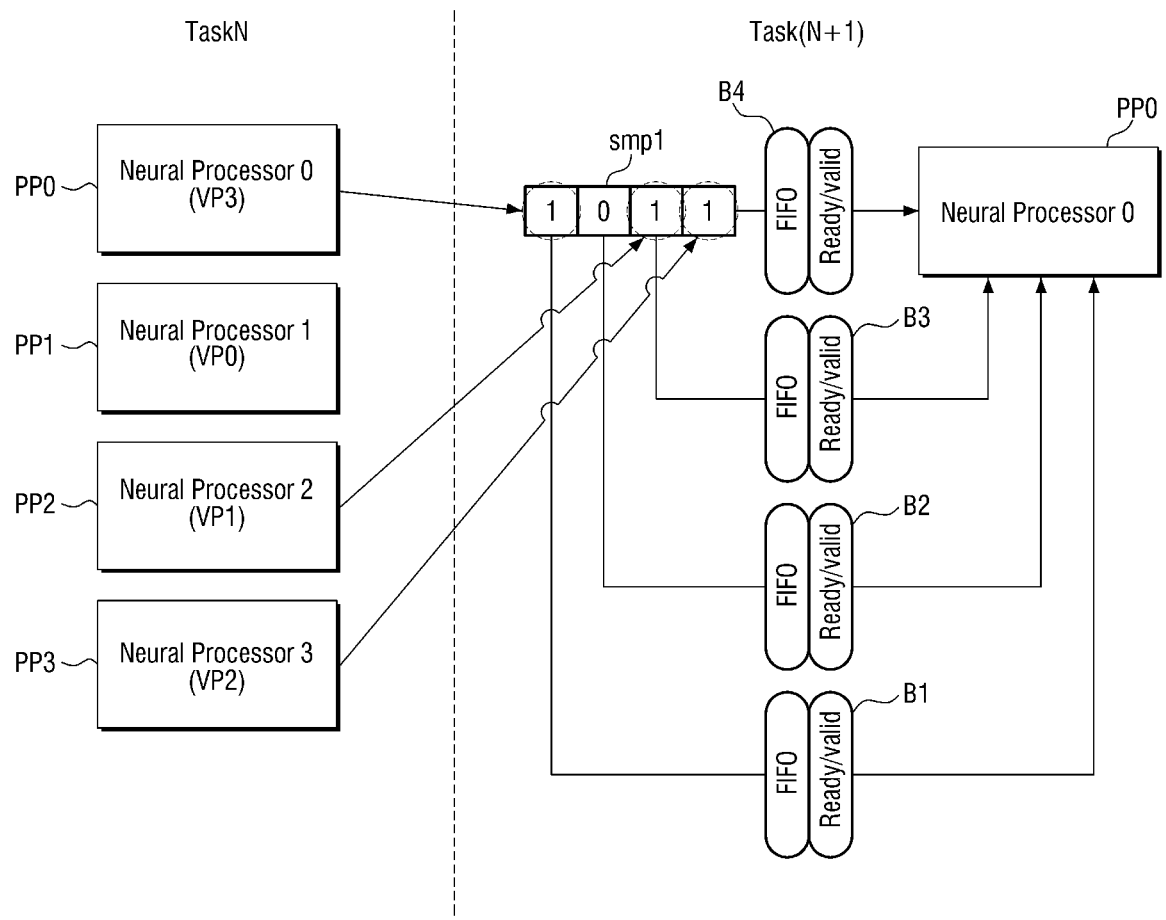
FIG. 20 is a conceptual diagram for illustrating an operation of receiving a synchronization signal according to a sync target for L3 synchronization of a neural processing device in accordance with some embodiments.

FIG. 20 is a conceptual diagram for illustrating an operation of receiving a synchronization signal according to a sync target for L3 synchronization of a neural processing device in accordance with some embodiments.

Referring to FIG. 20, the first neural processor PP0 may receive synchronization signals from the first, third, and fourth neural processors PP0, PP2, and PP3 except for the second neural processor PP1. Accordingly, the first to fourth fields of the first semaphore memory smp1 corresponding to the first neural processor PP0 may be set equal to 1, 0, 1, and 1, respectively.

The neural processing device in accordance with some embodiments may include first to fourth FIFO buffers B1 to B4 corresponding to the first to fourth fields, respectively. The first to fourth FIFO buffers may provide the values of the first to fourth fields of the first semaphore memory smp1, respectively, to the first neural processor PP0 in a FIFO (first in first out) fashion.

In general, the tasks of the neural processing device are not just represented by a simple straight line as shown in FIG. 18. In other words, one task may have a dependency chain for several previous tasks. Accordingly, multiple semaphore memories may be required for a job having one or more dependency chains.

However, if the number of semaphore memories increases, the required memory space also increases accordingly, and thus, the resources required for a small space may become excessive. Accordingly, the neural processing device in accordance with some embodiments may promote efficient use of memory space by adding a FIFO buffer to one semaphore memory per neural processor.

In other words, if synchronization signals for multiple dependencies are sequentially inputted into the FIFO buffer, even one semaphore memory can sequentially process the synchronization signals without missing them. Accordingly, the present embodiment can perform the tasks of multiple dependency chains without difficulty while increasing the memory efficiency.

Figure 21:
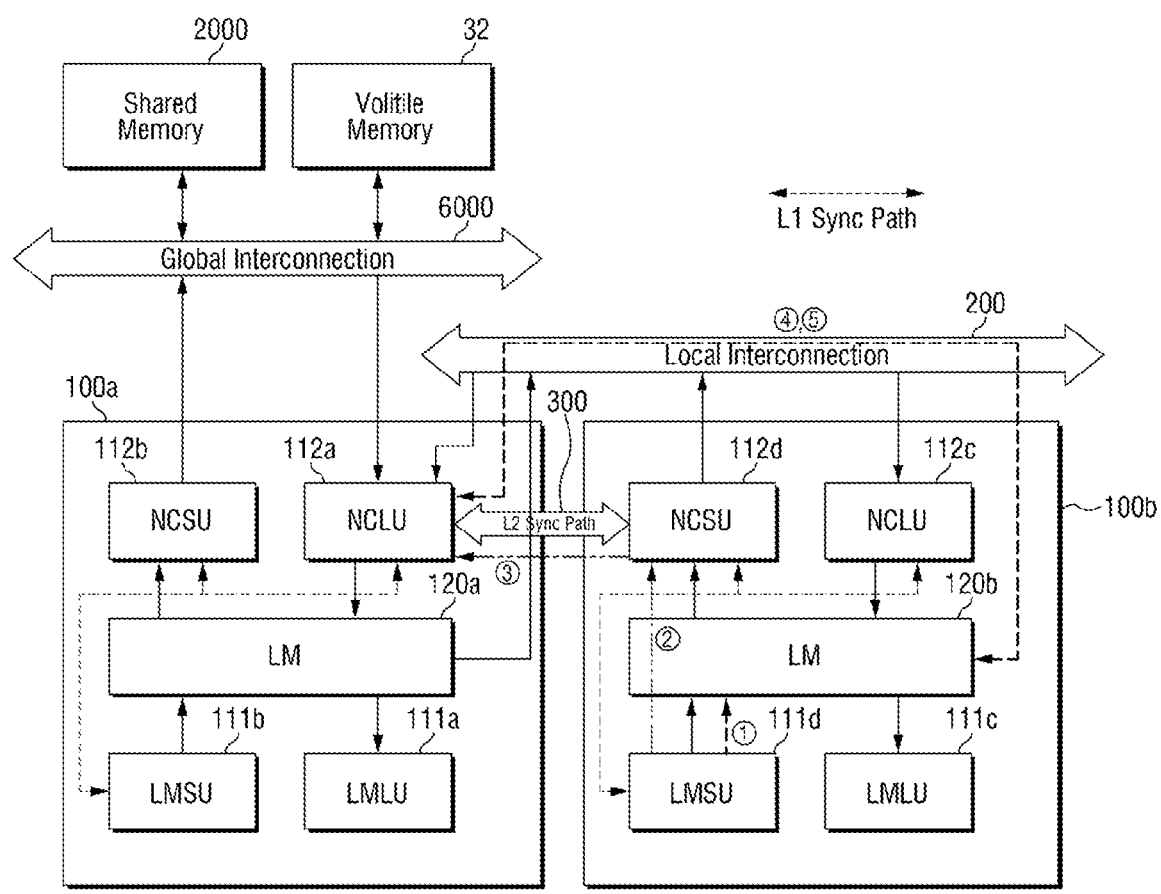
FIG. 21 is a block diagram for illustrating L1 and L2 synchronization of a neural processing device in accordance with some embodiments.
Figure 22:
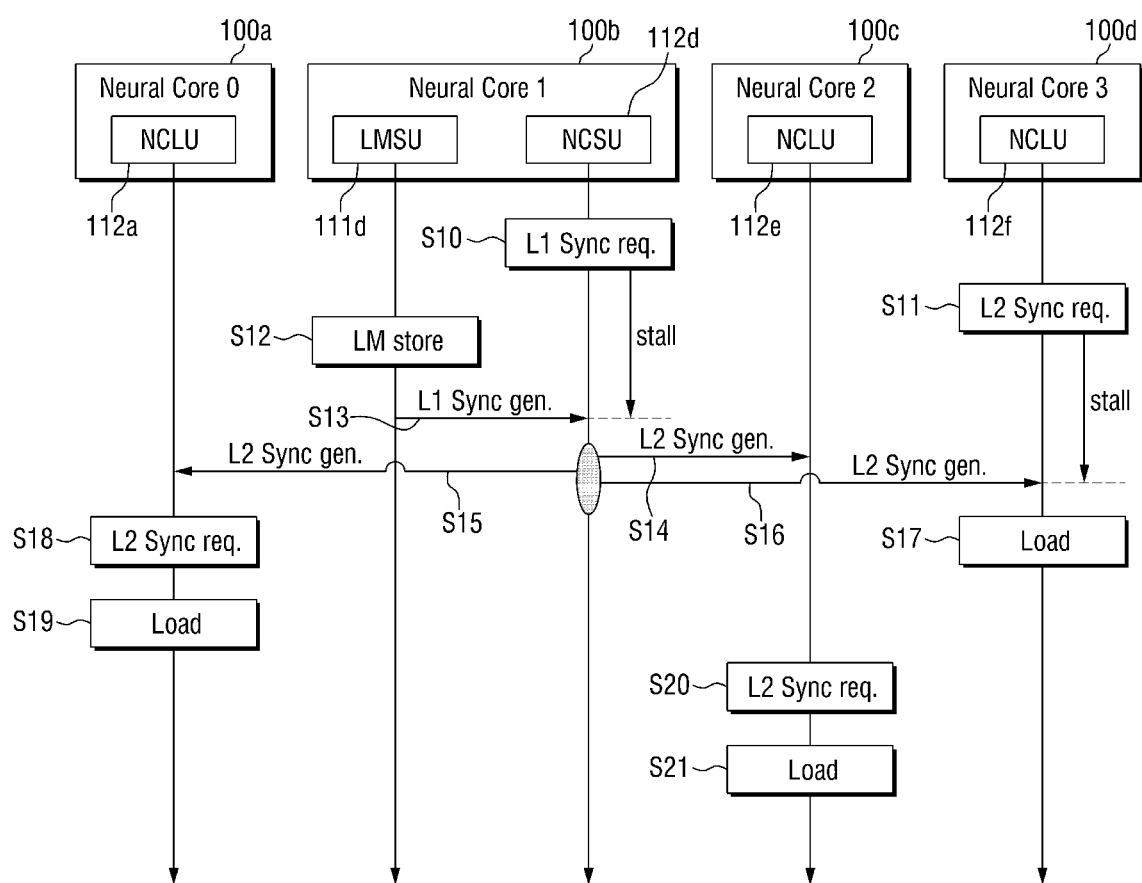
FIG. 22 is a ladder diagram for illustrating L1 and L2 synchronization of a neural processing device in accordance with some embodiments.

FIG. 21 is a block diagram for illustrating L1 and L2 synchronization of a neural processing device in accordance with some embodiments, and FIG. 22 is a ladder diagram for illustrating L1 and L2 synchronization of a neural processing device in accordance with some embodiments.

Referring to FIG. 21, the first neural core 100*a* may include a first neural core store unit 112*b*, a first neural core load unit 112*a*, a first local memory 120*a*, a first local memory store unit 111*b*, and a first local memory load unit 111*a*.

Similarly, the second neural core 100*b* may include a second neural core store unit 112*d*, a second neural core load unit 112*c*, a second local memory 120*b*, a second local memory store unit 111*d*, and a second local memory load unit 111*c*.

At S10 in FIG. 22, the second neural core store unit 112*d* of the second neural core 100*b* generates an L1 sync request signal.

The L1 sync request signal may be synchronized when an L1 sync generate signal comes, and may be maintained in a stall state until then. In other words, the L1 sync request signal may be generated in a preparatory state for synchronization.

At S11 in FIG. 22, the fourth neural core load unit 112*f* of the fourth neural core 100*d* may generate a receive L2 sync.

If there are a plurality of neural cores, the point in time of each synchronization preparation may be different. As a matter of course, a receive L2 sync may also be generated early as in the fourth neural core 100*d*.

At S12 in FIG. 22 or ① in FIG. 21, the second local memory store unit 111*d* stores data in the second local memory 120*b*. At S13 in FIG. 22 or ② in FIG. 21, the second local memory store unit 111*d* transmits an L1 sync generate signal to the second neural core store unit 112*d*. In this case, the L1 sync generate signal may be transmitted using the L1 sync path. Accordingly, the L1 sync request signal of the second neural core store unit 112*d* may be synchronized.

At S14, S15, and S16 in FIG. 22, or ③ in FIG. 21, the second neural core store unit 112*d* may broadcast a send L2 sync to the first neural core load unit 112*a* of the first neural core 100*a*, the third neural core load unit 112*e* of the third neural core 100*c*, and the fourth neural core load unit 112*f* of the fourth neural core 100*d*. In this case, the send L2 sync may be transmitted through the L2 sync path 300.

In this case, at S17 in FIG. 22, the fourth neural core 100*d* which has already generated the receive L2 sync at S11 in FIG. 22 proceeds with synchronization immediately and performs a load task.

In contrast, the first neural core 100*a* may performs a load task at S19 in FIG. 22, or ④ and ⑤ in FIG. 21 when the receive L2 sync is generated at S18 in FIG. 22.

In the load task, the first neural core load unit 112*a* may perform a data request to the second local memory 120*b* through the local interconnection 200 at ④ in FIG. 21, and receive a data reply to the request at ⑤ in FIG. 21.

Similarly, for the third neural core 100*c* as well, a load task may be performed (S21) when the receive L2 sync is generated at S20 in FIG. 22.

Both the synchronization of L2 (level 2) and synchronization of L1 (level 1) of this embodiment are not managed by the control processor but are performed by the respective elements in parallel, which can bring great advantages in terms of latency and efficiency.

Figure 23:
FIG. 23 is a diagram for illustrating an instruction set architecture of a neural processing device in accordance with some embodiments.

FIG. 23 is a diagram for illustrating an instruction set architecture of a neural processing device in accordance with some embodiments.

Referring to FIG. 23, the instruction set architecture (ISA) of a neural processing device in accordance with some embodiments may include an operation code opcode, a source register Src0, an L1 sync target (target for L1 sync), an L2 sync target (target for L2 sync), an L3 sync target (target for L3 sync), and a branch end BE. In other words, all the sync targets of levels 1 to 3 (L1 to L3) may be included in the architecture of the instruction set.

Figure 24:
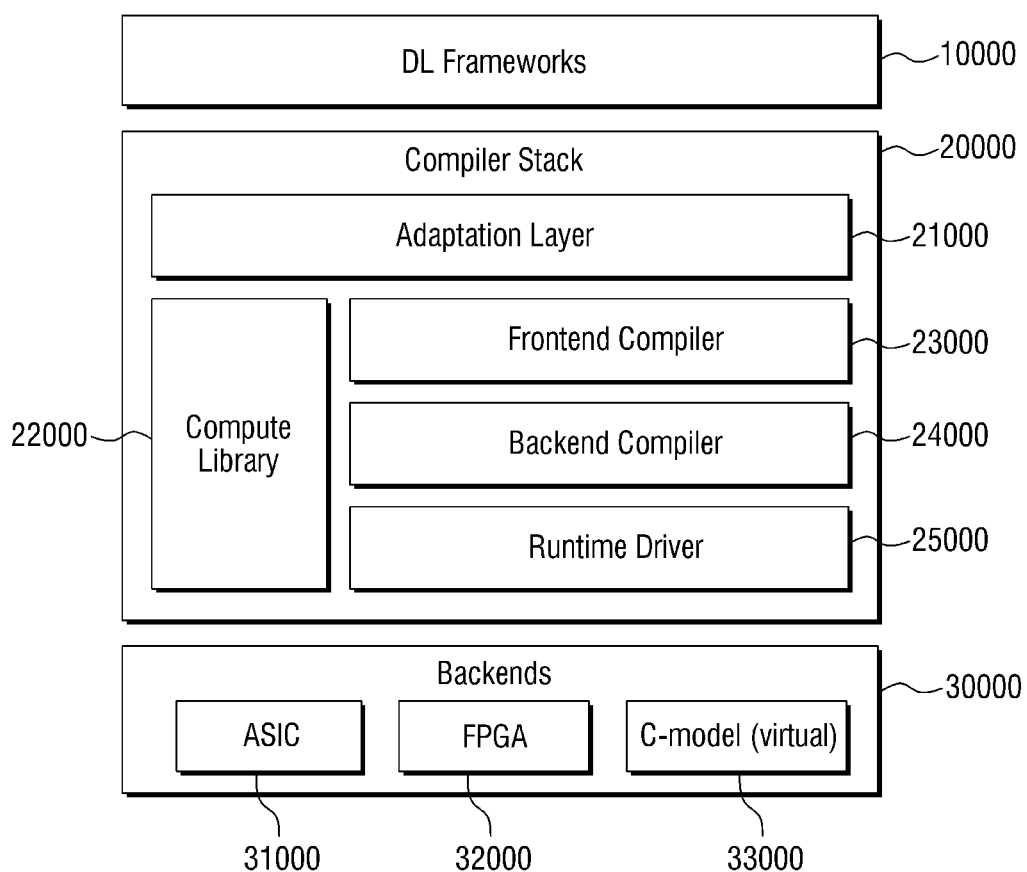
FIG. 24 is a block diagram for illustrating a software hierarchy of a neural processing device in accordance with some embodiments.

FIG. 24 is a block diagram for illustrating a software hierarchy of a neural processing device in accordance with some embodiments.

Referring to FIG. 24, the software hierarchy of the neural processing device in accordance with some embodiments may include a DL framework 10000, a compiler stack 20000, and a back-end module 30000.

The DL framework 10000 may mean a framework for a deep learning model network used by a user. For example, a neural network that has finished training may be generated using a program such as TensorFlow or PyTorch.

The compiler stack 20000 may include an adaptation layer 21000, a compute library 22000, a front-end compiler 23000, a back-end compiler 24000, and a runtime driver 25000.

The adaptation layer 21000 may be a layer in contact with the DL framework 10000. The adaptation layer 21000 may quantize a neural network model of a user generated by the DL framework 10000 and modify graphs. In addition, the adaptation layer 21000 may convert the type of model into a required type.

The front-end compiler 23000 may convert various neural network models and graphs transferred from the adaptation layer 21000 into a constant intermediate representation IR. The converted IR may be a preset representation that is easy to handle later by the back-end compiler 24000.

The optimization that can be done in advance in the graph level may be performed on such an IR of the front-end compiler 23000. In addition, the front-end compiler 23000 may finally generate the IR through the task of converting it into a layout optimized for hardware.

The back-end compiler 24000 optimizes the IR converted by the front-end compiler 23000 and converts it into a binary file, enabling it to be used by the runtime driver. The back-end compiler 24000 may generate an optimized code by dividing a job at a scale that fits the details of hardware.

The compute library 22000 may store template operations designed in a form suitable for hardware among various operations. The compute library 22000 provides the back-end compiler 24000 with multiple template operations required by hardware, allowing the optimized code to be generated.

The runtime driver 25000 may continuously perform monitoring during driving, thereby making it possible to drive the neural network device in accordance with some embodiments. Specifically, it may be responsible for the execution of an interface of the neural network device.

The back-end module 30000 may include an ASIC (application-specific integrated circuit) 31000, an FPGA (field-programmable gate array) 32000, and a C-model 33000. The ASIC 31000 may refer to a hardware chip determined according to a predetermined design method. The FPGA 32000 may be a programmable hardware chip. The C-model 33000 may refer to a model implemented by simulating hardware on software.

The back-end module 30000 may perform various tasks and derive results by using the binary code generated through the compiler stack 20000.

Figure 25:
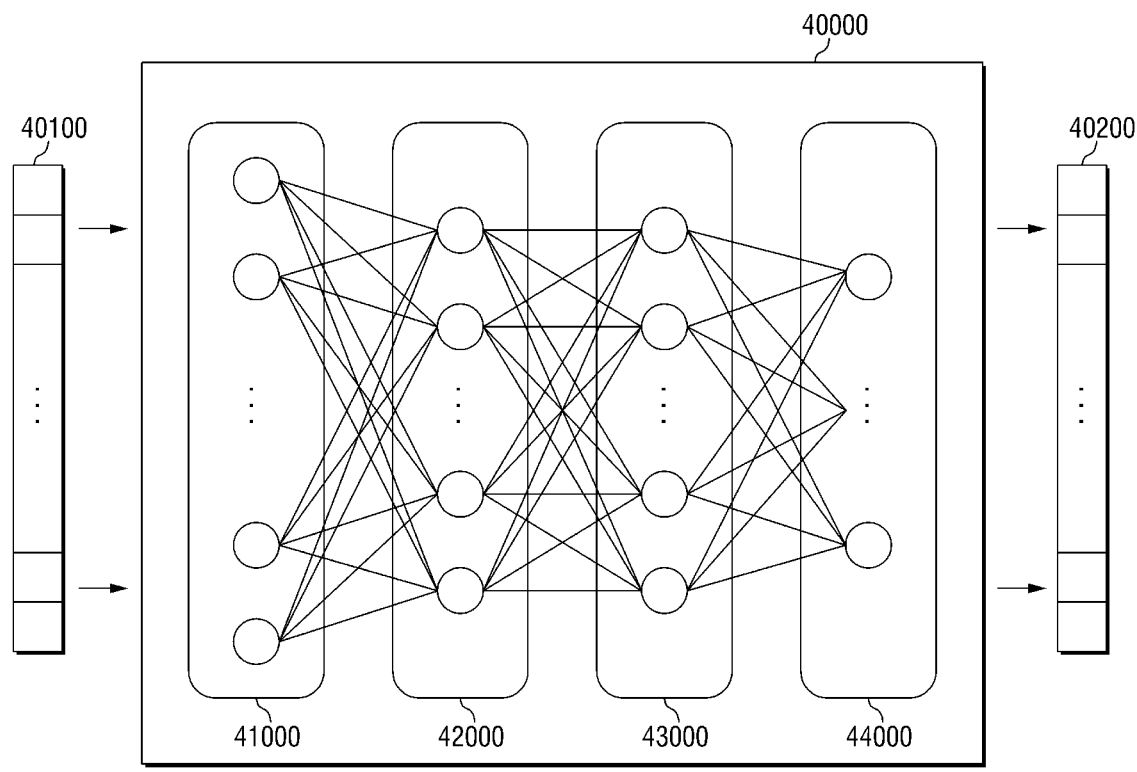
FIG. 25 is a conceptual diagram for illustrating deep learning calculations performed by a neural processing device in accordance with some embodiments.

FIG. 25 is a conceptual diagram for illustrating deep learning calculations performed by a neural processing device in accordance with some embodiments.

Referring to FIG. 25, an artificial neural network model 40000 is one example of a machine learning model, and is a statistical learning algorithm implemented based on the structure of a biological neural network or is a structure for executing the algorithm, in machine learning technology and cognitive science.

The artificial neural network model 40000 may represent a machine learning model having an ability to solve problems by learning to reduce the error between an accurate output corresponding to a particular input and an inferred output by repeatedly adjusting the weight of the synapse by nodes, which are artificial neurons that have formed a network by combining synapses, as in a biological neural network. For example, the artificial neural network model 40000 may include any probabilistic model, neural network model, etc., used in artificial intelligence learning methods such as machine learning and deep learning.

A neural processing device in accordance with some embodiments may implement the form of such an artificial neural network model 40000 and perform calculations. For example, the artificial neural network model 40000 may receive an input image, and may output information on at least a part of an object included in the input image.

The artificial neural network model 40000 may be implemented by a multilayer perceptron (MLP) including multilayer nodes and connections between them. An artificial neural network model 40000 in accordance with the present embodiment may be implemented using one of various artificial neural network model structures including the MLP. As shown in FIG. 25, the artificial neural network model 40000 includes an input layer 41000 that receives input signals or data 40100 from the outside, an output layer 44000 that outputs output signals or data 40200 corresponding to the input data, and n (where n is a positive integer) hidden layers 42000 to 43000 that are located between the input layer 41000 and the output layer 44000 and that receive a signal from the input layer 41000, extract characteristics, and forward them to the output layer 44000. Here, the output layer 44000 receives signals from the hidden layers 42000 to 43000 and outputs them to the outside.

The learning methods of the artificial neural network model 40000 include a supervised learning method for training to be optimized to solve a problem by the input of teacher signals (correct answers), and an unsupervised learning method that does not require teacher signals.

The neural processing device may directly generate training data, through simulations, for training the artificial neural network model 40000. In this way, by matching a plurality of input variables and a plurality of output variables corresponding thereto with the input layer 41000 and the output layer 44000 of the artificial neural network model 40000, respectively, and adjusting the synaptic values between the nodes included in the input layer 41000, the hidden layers 42000 to 43000, and the output layer 44000, training may be made to enable a correct output corresponding to a particular input to be extracted. Through such a training phase, it is possible to identify the characteristics hidden in the input variables of the artificial neural network model 40000, and to adjust synaptic values (or weights) between the nodes of the artificial neural network model 40000 so that an error between an output variable calculated based on an input variable and a target output is reduced.

Figure 26:
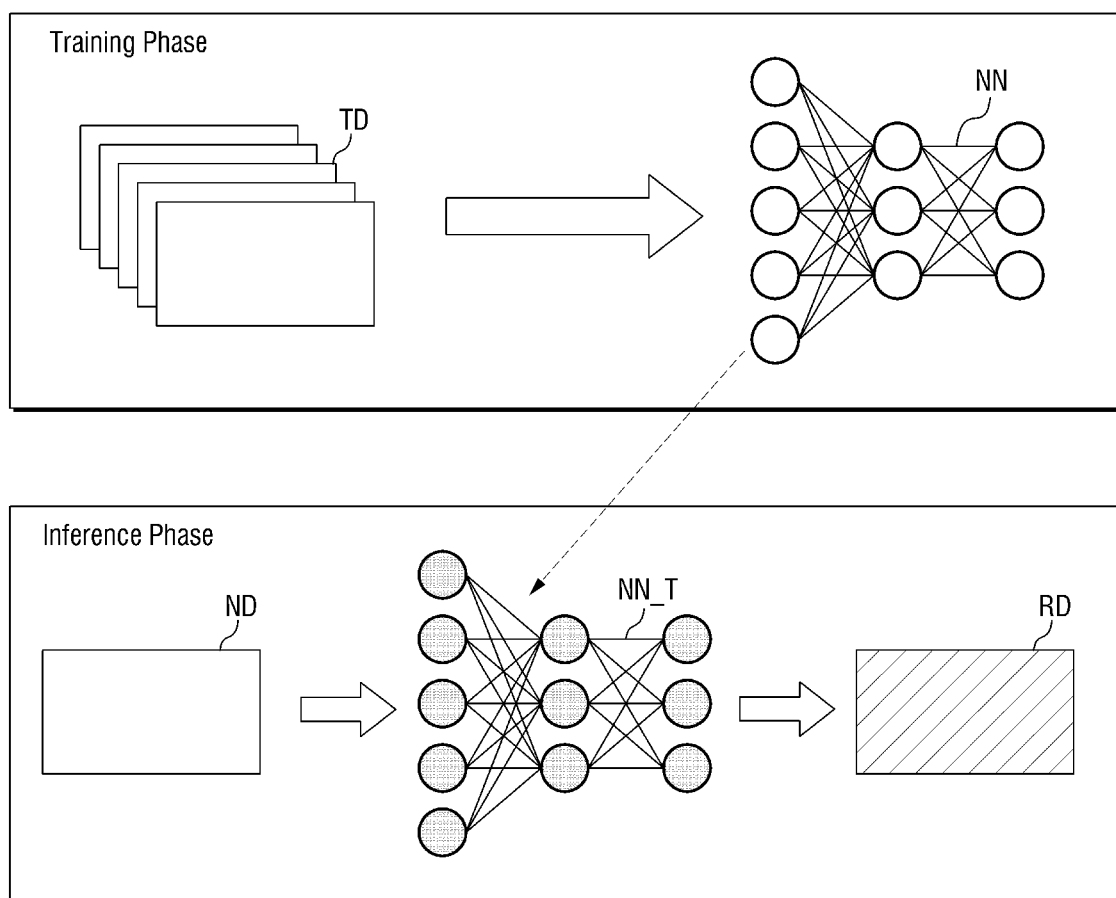
FIG. 26 is a conceptual diagram for illustrating training and inference operations of a neural network of a neural processing device in accordance with some embodiments.

FIG. 26 is a conceptual diagram for illustrating training and inference operations of a neural network of a neural processing device in accordance with some embodiments.

Referring to FIG. 26, the training phase may be subjected to a process in which a large number of pieces of training data TD are passed forward to the artificial neural network model NN and are passed backward again. Through this, the weights and biases of each node of the artificial neural network model NN are tuned, and training may be performed so that more and more accurate results can be derived through this. Through the training phase as such, the artificial neural network model NN may be converted into a trained neural network model NN_T.

In the inference phase, new data ND may be inputted into the trained neural network model NN_T again. The trained neural network model NN_T may derive result data RD through the weights and biases that have already been used in the training, with the new data ND as input. For such result data RD, what training data TD were used in training and how many pieces of training data TD were used in the training phase may be important.

Hereinafter, a method for synchronizing a neural processing device in accordance with some embodiments will be described with reference to FIGS. 17, 19, 20, 27, and 28. The parts overlapping with the embodiments described above will be simplified or omitted.

Figure 27:
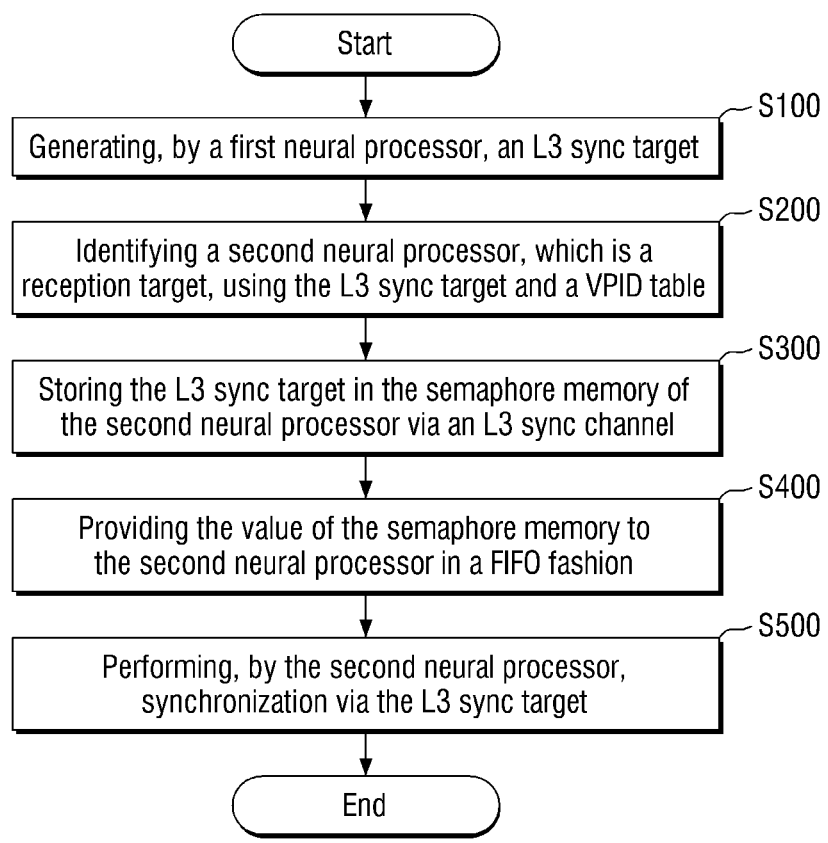
FIG. 27 is a flowchart for illustrating a method for synchronizing a neural processing device in accordance with some embodiments.
Figure 28:
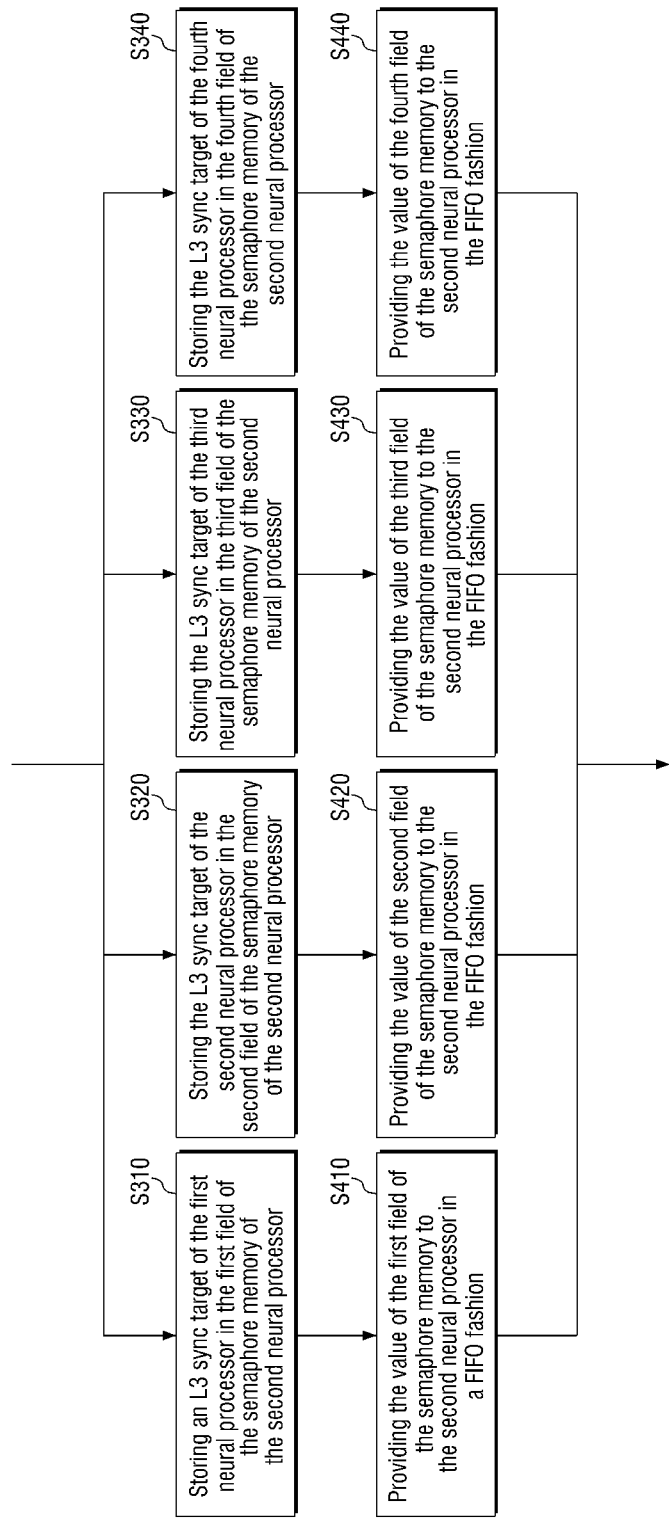
FIG. 28 is a flowchart for illustrating in detail the step of storing an L3 sync target and the step of providing based on FIFO of FIG. 27.

FIG. 27 is a flowchart for illustrating a method for synchronizing a neural processing device in accordance with some embodiments, and FIG. 28 is a flowchart for illustrating in detail the step of storing an L3 sync target and the step of providing based on FIFO of FIG. 27.

Referring to FIG. 27, a first neural processor generates an L3 sync target at S100.

Specifically, referring to FIG. 17, the L3 sync target Sm_V may be a signal generated by each of the neural processors that transmit synchronization signals. In some embodiments, the L3 sync target Sm_V may include a plurality of fields. For example, the L3 sync target Sm_V may include four fields. This may be due to the fact that there are four neural processors in the same set. The four fields of the L3 sync target Sm_V may correspond to the first to fourth virtual IDs VP0 to VP3, respectively. In some embodiments, if values 1, 0, 1, and 1 are written in the L3 sync target Sm_V, then the values 1, 1, 0, and 1 may correspond to the first to fourth virtual IDs VP0 to VP3 in the reverse order, respectively.

Referring to FIG. 27 again, a second neural processor, which is a reception target, is identified using the L3 sync target and a VPID table at S200.

Specifically, referring to FIG. 17, the neural processors to transmit the synchronization signal for the L3 sync target Sm_V, may check the physical IDs of the corresponding neural processors through the VPID table TB_VTP after the virtual IDs of the neural processors to which the synchronization signal for the L3 sync target Sm_V needs to be transmitted have been identified as the first, second, and fourth virtual IDs VP0, VP1, and VP3. The neural processor may be able to check the actual address by checking the physical ID.

As the VPID table TB_VTP has values of 3, 0, 1, and 2, it can be seen that the physical IDs of the first, second, and fourth virtual IDs VP0, VP1, and VP3 are 2, 1, and 3, respectively. In other words, the second to fourth neural processors PP1 to PP3 may be neural processors that receive a synchronization signal corresponding to the L3 sync target Sm_V.

Referring to FIG. 27 again, the synchronization signal corresponding to the L3 sync target is stored in the semaphore memory of the second neural processor via the L3 sync channel at S300.

Specifically, referring to FIG. 19, the first semaphore memory smp1 may include first to fourth fields, and the first to fourth fields may correspond to the first to fourth neural processors PP0 to PP3, respectively. That is, the first to fourth fields may be arranged in the same order as the physical IDs of the first to fourth neural processors PP0 to PP3.

In other words, the first field of the first semaphore memory smp1 is a portion for the first neural processor PP0, and may be expressed as 1 if a synchronization signal corresponding to the L3 sync target Sm_V is received from the first neural processor PP0, and if not, may be expressed as 0. As a matter of course, it may also be possible to express in the opposite way.

Referring to FIG. 27 again, the value of the semaphore memory is provided to the second neural processor based on FIFO at S400.

Specifically, referring to FIG. 20, the neural processing device in accordance with some embodiments may include first to fourth FIFO buffers B1 to B4 corresponding to the first to fourth fields, respectively. The first to fourth FIFO buffers may provide the values of the first to fourth fields of the first semaphore memory smp1, respectively, to the first neural processor PP0 in a FIFO (first in first out) fashion.

Referring to FIG. 28, steps S300 and S400 will be described in detail.

The synchronization signal according to the L3 sync target of the first neural processor is stored in the first field of the semaphore memory of the second neural processor at S310, and the value of the first field of the semaphore memory is provided to the second neural processor based on FIFO at S410.

Similarly, the synchronization signal according to the L3 sync target of the second neural processor is stored in the second field of the semaphore memory of the second neural processor (S320), and the value of the second field of the semaphore memory is provided to the second neural processor based on FIFO at S420.

The synchronization signal according to the L3 sync target of the third neural processor is stored in the third field of the semaphore memory of the second neural processor (S330), and the value of the third field of the semaphore memory is provided to the second neural processor based on FIFO at S430.

The synchronization signal according to the L3 sync target of the fourth neural processor is stored in the fourth field of the semaphore memory of the second neural processor (S340), and the value of the fourth field of the semaphore memory is provided to the second neural processor based on FIFO at S440.

That is, fields correspond to neural processors, respectively, and synchronization may proceed in parallel based on FIFO.

Referring to FIG. 27 again, the second neural processor performs synchronization via the L3 sync target at S500.

Hereinafter, a method for synchronizing a neural processing device in accordance with some embodiments will be described with reference to FIGS. 21, 22, 29, and 30. The parts overlapping with the embodiments described above will be simplified or omitted.

Figure 29:
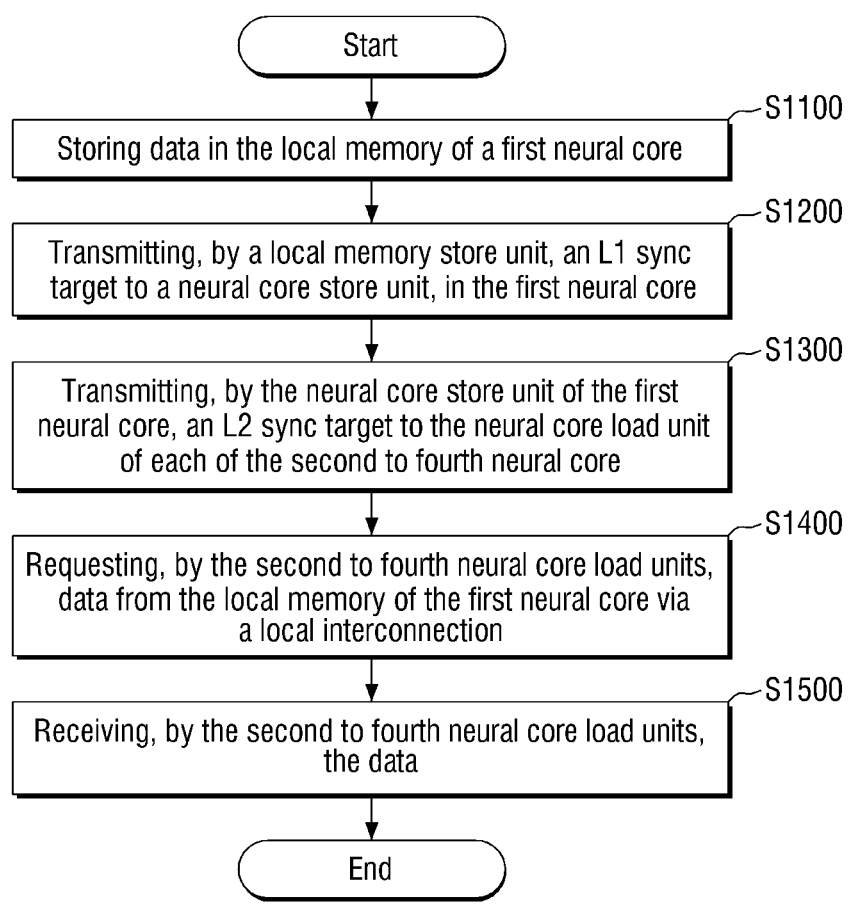
FIG. 29 is a flowchart for illustrating a method for synchronizing L1 and L2 levels of a neural processing device in accordance with some embodiments.
Figure 30:
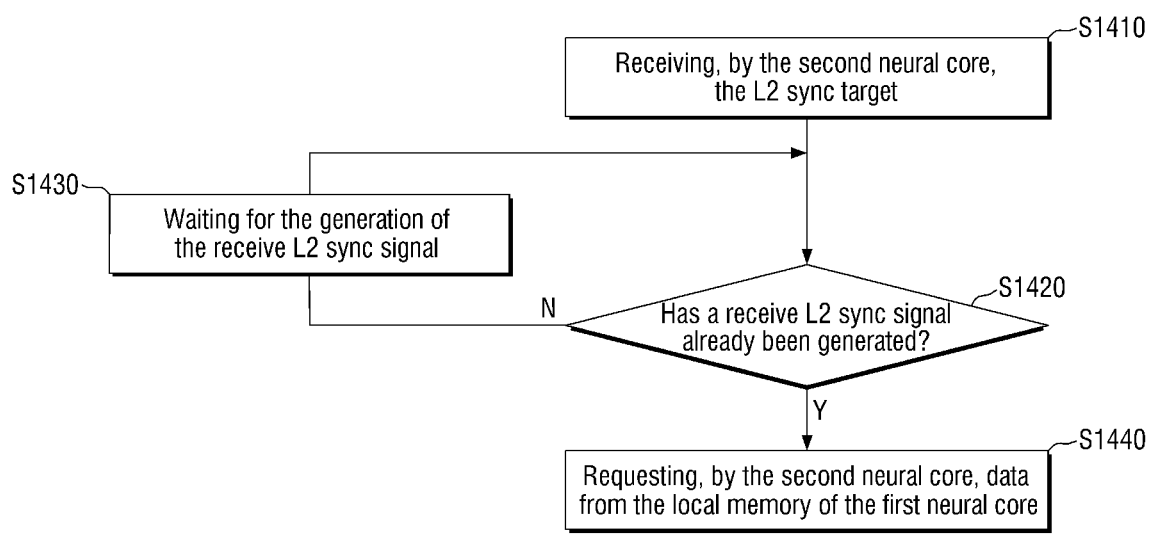
FIG. 30 is a flowchart for illustrating the step of requesting data of FIG. 29.

FIG. 29 is a flowchart for illustrating a method for synchronizing L1 and L2 levels of a neural processing device in accordance with some embodiments, and FIG. 30 is a flowchart for illustrating the step of requesting data of FIG. 29.

Referring to FIG. 29, data is stored in the local memory of a first neural core at S1100 in FIG. 29. Next, in the first neural core, a local memory store unit transmits a synchronization signal according to an L1 sync target to a neural core store unit at S1200 in FIG. 29.

Specifically, referring to FIGS. 21 and 22, the second local memory store unit 111d stores data in the second local memory 120b at S12 in FIG. 22, or in FIG. 21. Next, the second local memory store unit 111d transmits an L1 sync generate signal to the second neural core store unit 112d at S13 in FIG. 22 or ⓪ in FIG. 21. At this time, the L1 sync generate signal may be transmitted using the L1 sync path. Accordingly, the L1 sync request signal of the second neural core store unit 112d may be synchronized.

Referring to FIG. 29 again, the neural core store unit of the first neural core transmits a synchronization signal according to an L2 sync target to the neural core load unit of each of the second to fourth neural cores at S1300 in FIG. 29.

Specifically, referring to FIGS. 21 and 22, next, the second neural core store unit 112d may broadcast a send L2 sync to the first neural core load unit 112a of the first neural core 100a, the third neural core load unit 112e of the third neural core 100c, and the fourth neural core load unit 112f of the fourth neural core 100d at S14, S15, and S16 in FIG. 22, or ③ in FIG. 21. At this time, the send L2 sync may be transmitted via the L2 sync path 300.

Referring to FIG. 29 again, the second to fourth neural core load units request data from the local memory of the first neural core via a local interconnection at S1400 in FIG. 29.

Referring in detail to FIG. 30, the second neural core receives the synchronization signal corresponding to the L2 sync target at S1410 in FIG. 30, and determines whether a receive L2 sync signal has already been generated at S1420 in FIG. 30. If not, it waits for the generation of the receive L2 sync signal at S1430 in FIG. 30, and if so, the second neural core requests data from the local memory of the first neural core at S1440 in FIG. 30.

Referring to FIG. 29 again, the second to fourth neural core load units receive the data at S1500 in FIG. 29.

What is claimed is:

1. A neural processing device comprising:
   first and second neural cores; and,
   an L2 sync path configured to directly transmit an L2 synchronization signal between the first and second neural cores,
   wherein the first neural core comprises,
     a first local memory included in the first neural core and temporarily storing first data to be input and output,
     a first load/store unit (LSU) included in the first neural core and moving the first data in the first local memory,
     a processing unit included in the first neural core and performing an computation operation on the first data,
     a data path through which the first data is transmitted between the local memory, the first LSU, and the processing unit, and
     an L1 sync path configured to transmit an L1 synchronization signal, in the first neural core, between the first local memory, the first LSU, and the processing unit, wherein the L1 sync path is a separate path from the data path.

2. The neural processing device of claim 1, further comprising a local interconnection configured to transmit second data between the first and second neural cores,
   wherein the second data of the local interconnection and the L2 synchronization signal of the L2 sync path are transmitted independently of each other.

3. The neural processing device of claim 1, wherein the first LSU comprises,
   a local memory store unit for storing to the first local memory;
   a local memory load unit for loading from the first local memory;
   a first neural core store unit for performing storage externally from the first neural core; and
   a first neural core load unit that performs an external load on the first neural core.

4. The neural processing device of claim 1, wherein the first LSU comprises,
   a local memory store unit for storing to the first local memory;
   a first neural core store unit for performing storage externally from the neural core;
   wherein the L1 synchronization signal is transmitted between the local memory store unit and the first neural core store unit through the L1 sync path.

5. The neural processing device of claim 4, wherein the L1 synchronization signal comprises,
   an L1 sync generation signal transmitted when the first neural core store unit is switched to a ready state for L1 synchronization;
   an L1 sync request signal synchronized in correspondence with the L1 synchronization signal,
   wherein the L1 sync request signal comprises a first L1 sync request signal generated by the first neural core store unit.

6. The neural processing device of claim 1, wherein the L2 sync path is transmitted from the first neural core store unit in the first neural core to the second neural core.

7. The neural processing device of claim 6, further comprising,
   a first neural processor comprising the first and second neural core,
   a first and second semaphore memory for receiving and storing L3 sync target inside the first neural processor, wherein the each of first and second semaphore memory is performed the L3 synchronization of the first neural processor according to the L3 sync target.

8. A neural processing device comprising:
   first and second neural cores;
   a L2 shared memory shared by the first and second neural core;
   a local interconnection configured to connect the first and second neural core and the L2 shared memory and transmit data; and
   an L2 sync path is independent of the local interconnection, directly transmit an L2 synchronization signal between the first and second neural core and the L2 shared memory,
   wherein the L2 sync path is physically separated from the local interconnection such that the data of the local interconnection and the L2 synchronization signal of the L2 sync path are transmitted independently of each other.

9. The neural processing device of claim 8, wherein the first neural core comprises a first LSU moving data within the first neural core, wherein the first LSU comprises a first neural core store unit,
wherein second neural core comprises a second LSU moving data within the second neural core, wherein the second LSU comprises a second neural core load unit,
wherein the L2 synchronization signal is transmitted between the first neural core store unit and the second neural core load unit through the L2 sync path.

10. The neural processing device of claim 9, wherein the L2 synchronization signal comprises,
a send L2 sync transmitted to the first neural core store unit, and
a receive L2 sync generated to perform a load operation in correspondence with the send L2 sync,
wherein the receive L2 sync comprises a first receive L2 sync generated by the second neural core load unit.

11. The neural processing device of claim 8, further comprising,
a first neural processor comprising the first and second neural cores,
a second neural processor,
a shared memory shared by the first and second neural processors,
a global interconnection configured to connect the first and second neural processors and the shared memory and comprises an L3 sync channel configured to transmit an L3 synchronization signal between the first and second neural processors.

12. The neural processing device of claim 11, wherein the first neural core comprises an L1 sync path configured to transmit an L1 synchronization signal inside the first neural core.

13. A method for synchronizing a neural processing device including first and second neural cores, and a local interconnection configured to transmit data between the first and second neural cores, the method comprising:
transmitting an L1 synchronization signal within the first neural core through an L1 sync path separate from a data path through which a first data is transmitted within the first neural core;
directly transmitting, by the first neural core, an L2 synchronization signal from the first neural cores to the second neural core through an L2 sync path; and
after performing an L2 synchronization based on the L2 synchronization signal, receiving, by the second neural core, the first data through the local interconnection,
wherein the L2 sync path is physically separated from the local interconnection such that the first data of the local interconnection and the L2 synchronization signal of the L2 sync path are transmitted independently of each other.

14. The method for synchronizing a neural processing device of claim 13, wherein transmitting the L1 synchronization signal comprises,
storing, by a local memory store unit of the first neural core second data in the local memory,
transmitting, by the local memory store unit, an L1 sync generation signal to a first neural core store unit, and
synchronizing an L1 sync request signal of the first neural core store unit.

15. The method for synchronizing a neural processing device of claim 14, wherein synchronizing an L1 sync request signal comprises,
maintaining a ready state for receiving the L1 sync generation signal, and
receiving, by the first neural core store unit, the L1 sync generation signal.

16. The method for synchronizing a neural processing device of claim 14, wherein transmitting the L2 synchronization signal comprises,
transmitting, by the first neural core store unit of the first neural core, a send L2 sync to a second neural core load unit of the second neural core;
generating, by the second neural core load unit, a receive L2 sync.

17. The method for synchronizing a neural processing device of claim 13, wherein receiving the first data comprises:
after generation of a receive L2 sync, performing, by the second neural core, a first data request to a local memory of the first neural core, and
performing, by the second neural core, a first data return for the first data request.

18. The method for synchronizing a neural processing device of claim 13, wherein the neural processing device comprises,
a first neural processor comprising the first and second neural cores, and
a second neural processor,
the method further comprising,
generating, by the first neural processor, an L3 sync target for an L3 synchronization,
arranging the L3 sync targets in order of virtual IDs of the first and second neural processors, and
identifying a physical ID of the second neural processor using the L3 sync target and a VPID table, wherein the VPID table is a conversion table between the virtual IDs and the physical ID of the neural processor.

19. The method for synchronizing a neural processing device of claim 13, wherein the neural processing device further comprises a global interconnection comprising an L3 sync channel, wherein the method further comprises:
storing an L3 synchronization signal according to the L3 sync target in a first semaphore memory of the second neural processor through the L3 sync channel, and
performing, by the second neural processor, the L3 synchronization according to the value of the first semaphore memory.

* * * * *